US011366921B2

(12) United States Patent
Lahav et al.

(10) Patent No.: US 11,366,921 B2
(45) Date of Patent: Jun. 21, 2022

(54) ENCRYPTING DATA RECORDS AND PROCESSING ENCRYPTED RECORDS WITHOUT EXPOSING PLAINTEXT

(71) Applicant: RingCentral, Inc., Belmont, CA (US)

(72) Inventors: Aviad Lahav, Tel-Aviv (IL); Lev Rosenblit, Shoam (IL)

(*) Notice: Subject to any disclaimer, the term of this patent is extended or adjusted under 35 U.S.C. 154(b) by 236 days.

(21) Appl. No.: 16/487,893

(22) PCT Filed: Feb. 22, 2018

(86) PCT No.: PCT/IL2018/050210
§ 371 (c)(1),
(2) Date: Aug. 22, 2019

(87) PCT Pub. No.: WO2018/154581
PCT Pub. Date: Aug. 30, 2018

(65) Prior Publication Data
US 2020/0012807 A1   Jan. 9, 2020

Related U.S. Application Data

(60) Provisional application No. 62/461,808, filed on Feb. 22, 2017.

(51) Int. Cl.
G06F 21/00   (2013.01)
G06F 21/62   (2013.01)
G06F 21/64   (2013.01)
H04L 9/08    (2006.01)
(Continued)

(52) U.S. Cl.
CPC ........ *G06F 21/6227* (2013.01); *G06F 16/901* (2019.01); *G06F 16/9038* (2019.01);
(Continued)

(58) Field of Classification Search
None
See application file for complete search history.

(56) References Cited

U.S. PATENT DOCUMENTS

| 5,978,795 A | 11/1999 | Poutanen et al. |
| 2005/0147246 A1 | 7/2005 | Agrawal et al. |

(Continued)

FOREIGN PATENT DOCUMENTS

| CN | 105787387 A | 7/2018 | |
| WO | 2016171271 A1 | 10/2016 | |
| WO | WO-2016171271 A1 * | 10/2016 | ............. G06F 21/62 |

OTHER PUBLICATIONS

Elmer Lastdrager: "Securing Patient Information in Medical Databases", Jan. 1, 2011 (Jan. 1, 2011), XP055665977, URL:https://essay.utwente.nl/61035/1/MSc_ELastdrager DIES CTIT.pdf [retrieved on Feb. 6, 2020] • abstract • "3.3.2 Entities"; p. 13 • 11 4.2. 7 Type-Based Proxy Re-Encryption"p. 26-p. 29 • 11 5.1 Database Setup" p. 37-p. 44.

(Continued)

*Primary Examiner* — Andrew J Steinle
(74) *Attorney, Agent, or Firm* — Finnegan, Henderson, Farabow, Garrett & Dunner, LLP

(57) ABSTRACT

A computer implemented method of applying a unified search for a match of one or more features in a plurality of encrypted records, comprising using one or more processors of a server associated with a database comprising a plurality of encrypted records. The processor(s) is adapted for receiving a query for searching one or more plaintext features in the plurality of encrypted, searching for a match of the one or more plaintext features using a first search methodology and a second search methodology and outputting an indication of matching encrypted records according to the match. Wherein the second search methodology is asymptotically faster than the first search methodology and wherein the first search methodology is used for searching a subset of the plurality of encrypted records selected based on status indication associated with each encrypted record.

9 Claims, 10 Drawing Sheets

(51) Int. Cl.
  *H04L 9/32* (2006.01)
  *G06F 16/901* (2019.01)
  *G06F 16/9038* (2019.01)
  *G06F 16/903* (2019.01)
  *G06F 21/60* (2013.01)
  *H04L 9/06* (2006.01)

(52) U.S. Cl.
  CPC ...... *G06F 16/90348* (2019.01); *G06F 21/602* (2013.01); *G06F 21/64* (2013.01); *H04L 9/0643* (2013.01); *H04L 9/0825* (2013.01); *H04L 9/0891* (2013.01); *H04L 9/0894* (2013.01); *H04L 9/3239* (2013.01); *H04L 2209/76* (2013.01)

(56) References Cited

U.S. PATENT DOCUMENTS

| | | | |
|---|---|---|---|
| 2007/0074047 A1 | 3/2007 | Metzger et al. | |
| 2007/0244865 A1 | 10/2007 | Gordon et al. | |
| 2012/0161936 A1* | 6/2012 | Yoon | G06K 19/07309 340/10.1 |
| 2013/0238646 A1* | 9/2013 | Maro | G06F 21/6227 707/758 |
| 2014/0025948 A1 | 1/2014 | Bestler et al. | |
| 2014/0281589 A1* | 9/2014 | Bain | G06F 21/6218 713/193 |
| 2016/0352705 A1 | 12/2016 | Lockhart et al. | |

OTHER PUBLICATIONS

Luan Ibraimi et al: AType-and-Identity-Based Proxy Re-encryption Scheme and Its Application in Healthcare 11, Aug. 24, 2008 (Aug. 24, 2008), Secure Data Management; [Lecture Notes in Computer Science], Springer Berlin Heidelberg, Berlin, Heidelberg, pp. 185-198, XP019102733, ISBN: 978-3-540-85258-2 the whole document.

"Modeling and assessing inference exposure in encrypted databases." ACM Transactions on Information and System Security (TISSEC) 8, No. 1 (2005): 119-152. (retrieved Jun. 7, 2018). Retrieved from the Internet: < http://www.academia.edu/download/30656475/tissuec05.pdf > Ceselli, et al. Feb. 8, 2005 (Feb. 8, 2005) Whole document.

Wang Jianfeng et al: "Enabling efficient approximate nearest neighbor search for outsourced database in cloud computing", Soft Computing, Springer Verlag, Berlin, DE, vol. 20, No. 11, Jul. 2, 2015 (Jul. 2, 2015), pp. 4487-4495, XP036070943, ISSN: 1432-7643, DOI: 10.1007/S00500-015-1758-6 [retrieved on Jul. 2, 2015] the whole document.

Chen Fei et al: "Privacy and integrity preserving multi-dimensional range queries for cloud computing", 2014 IFIP Networking Conference, IFIP, Jun. 2, 2014 (Jun. 2, 2014), pp. 1-9, XP032620616, DOI: 10.1109/IFIPNETWORKING.2014.6857083 [retrieved on Jul. 16, 2014] the whole document.

William F Gilreath: "Hash sort: A linear time complexity multiple-dimensional sort algorithm", arxiv.org, Cornell University Library, 201 Olin Library Cornell University Ithaca, NY 14853, Aug. 17, 2004 (Aug. 17, 2004), XP080162608, the whole document.

O. Günther et al., "Encryption techniques for secure database outsourcing," European Symposium on Research in Computer Security, pp. 327-342, Springer, Berlin, Heidelberg, 2007, 24 pages.

* cited by examiner

ENCRYPTING DATA RECORDS AND PROCESSING ENCRYPTED RECORDS WITHOUT EXPOSING PLAINTEXT

RELATED APPLICATIONS

This application claims the benefit of priority under 35 USC 119(e) of U.S. Provisional Patent Application No. 62/461,808 entitled "System and Method for Encrypting Data Records and Processing Encrypted Records without Exposing Plaintext" filed Feb. 22, 2017, the contents of which are incorporated herein by reference in their entirely.

BACKGROUND

The present invention, in some embodiments thereof, relates to encrypting, searching and processing encrypted data records of a database and, more specifically, but not exclusively, to encrypting, searching and processing encrypted data records of a database without exposing plaintext data contained in the data records.

With the constant evolution of information technology the volume of stored data may be huge. In order to effectively store and use such enormous data volumes data storage systems, in particular databases have become an essential resource for multiple applications.

Recent years have seen the rise of outsourced computing, in which physical computing resources are located in large datacenters and cloud services which may be accessed over the network and the internet. The storage resources and databases are no different and many organizations use service providers to host and/or store data in their remote datacenters and/or cloud services.

A plurality of applications may employ this operation model where tire computing resources and/or the storage resources are provided by lire remote datacenters and/or cloud services. In such applications, the data of the clients may be stored and processed in the remote datacenter operated by the service provider. The party who owns the data is therefore separate from the service provider and in most cases the owner is part of a different organization than the service provider. This implies that the data owner needs to entrust the service provider with sensitive data which is not always acceptable or desirable since the service providers may be susceptible to many kinds of data leakage, including, for example, cyber threats, illegal break-in attempts, curios administrators peeking into users' data, government surveillance and court-issued subpoenas.

To overcome this limitation, many of the storage resources and databases may employ an encrypted dam approach in which the data stored remotely is encrypted using encryption keys available only to the data owners.

SUMMARY

According to a first aspect of the present invention there is provided a computer implemented method of searching for a match of one or more features in a plurality of encrypted records, comprising using one or more processors of a server associated with a database comprising a plurality of non-indexed encrypted records, the processor(s) is adapted for:
Receiving a query for searching one or more plaintext features in the plurality of encrypted records, the query comprises a first hash value calculated for each of the one or more plaintext features.
Calculating, for each of the plurality of encrypted records, a second hash value based on the first hash value and a nonce associated with each encrypted record.
Searching for a match of the second hash value in each of a plurality of sorted hash arrays each associated with a respective one of the plurality of encrypted records using a binary search algorithm, each sorted hash array comprising a set of second hash values sorted according to their value, each of the second hash values is calculated for a respective feature of the respective encrypted record based on the first hash of the respective feature and the nonce of the respective encrypted record.
Outputting an indication of matching encrypted records according: to the match.

Searching for the features in the sorted hash array may require O(log N) operations, where N is the number of features. Such search may be significantly more efficient than a sequential search. Moreover, the sorted hash array may comprise a single chunk of memory and may thus provide better locality-of-reference and may better fit into cache memory of a processing device thus significantly improving the processing performance. Furthermore, the sorted allay may significantly reduce the overhead required for storing the array.

According to a second aspect of the present invention there is provided a system for searching for a match of one or more features in a plurality of encrypted records, comprising one or more processors of a server associated with a database comprising a plurality of encrypted records. The processor(s) is adapted to execute a code. The code comprising:
Code instructions to receive, from at least client device, a query for searching one or more plaintext features in the plurality of encrypted records, the query comprises a first hash value calculated for each of the one or more plaintext features.
Code instructions to calculate, for each of the plurality of encrypted records, a second hash value based on the first hash value and a nonce associated with each encrypted record.
Code instructions to search for a match oldie second hash value in each of a plurality of sorted hash arrays each associated with a respective one of die plurality of encrypted records using a binary search algorithm, each sorted hash array comprising a set of second hash values sorted according to their value, each of the second hash values is calculated for a respective feature of the respective encrypted record based on the first hash of the respective feature and the nonce of the respective encrypted record.
Code instructions to output an indication of matching encrypted records according to the search.

According to a third aspect of the present invention there is provided a computer implemented method of searching for a match of one or more features in a plurality of encrypted records, comprising using one or more processors of a server associated with a database comprising a plurality of encrypted records, the processor(s) is adapted for
Receiving a query for searching, one or more plaintext features in the plurality of encrypted records, the query comprises a first hash value calculated for the one or more features.
Searching for the plaintext feature in the plurality of encrypted records in a sequence of search iterations, each search iteration comprising.

Selecting one or more values from a sequence of values and calculating a one or more second hash values based on each of the one or more values and on the first hash value.

Searching for a match of the one or more second hash values in an encrypted index comprising a plurality of encrypted index entries each comprising a respective second hash value and an identifier associated with one of the plurality of the encrypted records.

Outputting an indication of matching encrypted records according to the match;

Wherein the searching terminates at detection of one or more termination conditions.

Searching for the features in the encrypted index which may directly map (second) hash values calculated for each of the features to encrypted records containing these features. This may significantly increase the search speed and hence yield significantly low response time to queries. Moreover, simultaneously querying a set (range) of values at once may further reduce overall response time for searching the database since multiple values may be searched in a single access to the database.

According to a fourth aspect of the present invention there is provided a computer implemented method of applying a unified search for a match of one or more features in a plurality of encrypted records, comprising using one or more processors of a server associated with a database comprising a plurality of encrypted records, the processor(s) is adapted for:

Receiving a query for searching one or more plaintext features in the plurality of encrypted.

Searching for a match of the one or more plain text features using a first search methodology and a second search methodology, wherein the second search methodology is asymptotically faster than the first search methodology and wherein the first search methodology is used for searching a subset of the plurality of encrypted records selected based on status indication, associated with each encrypted record.

Outputting an indication of matching, encrypted records according to the match.

The unified search comprising the two search methodologies may yield significantly improved search results since the second (faster) search methodology may be applied to the majority of the encrypted records. However, since the second (faster) search methodology requires the encrypted index which may be time consuming to create and update. Therefore the first (slower) search methodology may be applied for only a subset of encrypted records which may include a significantly small number of encrypted records, for example, encrypted records which are not yet indexed, i.e. non-indexed encrypted records, for example, recently updated encrypted records which have not undergone the time consuming indexing process.

According to a fifth aspect of the present invention there is provided a computer implemented method of executing a function on one or more encrypted record of a database, comprising using one or more processors of an isolated environment, the processor(s) is adapted for:

Retrieving one or more of a plurality of encrypted records of a database.

Decrypting the one or more encrypted records using a decryption key.

Executing one or more functions on the one or more decrypted records.

Encrypting a result of the unction using an encryption key.

Outputting the encrypted result.

Evaluating the function(s) in the isolated environment may provide a means for processing encrypted records of the database in a controlled fashion, since decryption keys and plaintext data may be restricted to the isolated execution environment of the function evaluator.

According to a sixth aspect of the present invention there is provided a computer implemented method of re-encrypting encrypted records stored in a database for distribution to a plurality of clients, comprising using one or more processors of a server associated with a database comprising a plurality of encrypted records, the processor(s) is adapted for:

Storing in the database one or more encrypted records received from a first client, the one or more encrypted records are encrypted by the first client using a first key.

Receiving, from a second client, a request to provide the one or more encrypted records.

Retrieving from a repository of re-encryption keys a second key associated with the second client.

Re-encrypting the one or more encrypted records by applying one or more proxy re-encryption algorithms using the second key.

Providing the one or more re-encrypted records to the second client, the second client decrypts the re-encrypted records using a decryption key.

Applying re-encryption may provide fine-grained control over access to the database for a group of clients. Moreover, clients may be added and/or removed without processing large amounts of encrypted data but rather, only issuing or revoking a single re-encryption key per client.

According to a seventh aspect of the present invention there is provided a computer implemented method of using a single keystream for encrypting a plurality of field values of a record, comprising using one or more processors adapted for:

Receiving a record comprising a plurality of plaintext field values each associated with a respective one of a plurality of fields.

Generating a single nonce.

Encrypting, individually, each of the plurality of field values using the single nonce to create an encrypted record comprising a keystream embedding the plurality of field values, wherein each of the plurality of field values is encrypted according to a unique cipher state selected for each of the plurality of fields, the cipher state indicates an offset in the keystream.

Outputting the encrypted record.

Using, the single nonce for encrypting the plurality of field values of the record may significantly reduce the amount of storage required for storing the encrypted record.

According to an eighth aspect of the present invention there is provided a computer implemented method of updating an encrypted record in a database, comprising using one or more processors of a client, the processor(s) is adapted for:

Extracting one or more features from a plaintext record of a database, the plaintext record comprising one or more field values.

Encrypting the plaintext record to obtain a respective encrypted record.

Creating upload wrapper comprising a search metadata mapping the one or more plaintext features.

Creating an upload record comprising the encrypted record and the upload wrapper; and Outputting the upload record.

Wherein the upload record is used for updating the encrypted record in the database and the search metadata extracted from the upload record is used for searching the one or more plaintext features in the encrypted record.

The upload wrapper may allow for including additional data necessary for working with encrypted data with minimal and potentially no adaptation effort of the service application to support receiving and storing such additional data. This may allow for a significantly faster and/or more efficient integration and/or adoption of the encryption functionality into legacy systems.

According to an ninth aspect of the present invention there is provided a computer implemented method of decrypting an encrypted record of a database, comprising using one or more processors of a diem, the processor(s) is adapted for:

Receiving one or more download wrappers from a server associated with a database, the download wrapper comprising one or more ciphertext values of an encrypted record and decryption key associated with the encrypted record.

Extracting the decryption key from the download wrapper.

Decrypting the one or more ciphertext values using the decryption key to obtain one or more respective plaintext values [download wrapper].

The download wrapper may allow for including additional data necessary for decrypting downloaded encrypted records with minimal and potentially no adaptation effort of the application using the data of the encrypted record. This may allow for a significantly faster and/or more efficient integration and/or adoption of the encryption functionality into legacy systems.

In a further implementation form of the third aspect, the one or more termination conditions comprise a first termination condition dictating termination of the search in case only some of the one or more second hash values selected in a current iteration has been found in the plurality of encrypted index entries.

In a further implementation form of the third aspect, the one or more termination conditions comprise a second termination condition dictating termination of the search in case a second hash value calculated based on a non-consecutive value is not found tri the plurality of encrypted index entries in a previous iteration.

In a further implementation form of the third aspect, the selecting of one or more values from a sequence of values comprises selecting non-consecutive values. Selecting non-consecutive values for one or more of the iterations may significantly increase the probability for identifying the overall range of encrypted index entries compared to selection of sequential values.

In a further implementation form of the third aspect, an identifier of matching encrypted records is extracted from each of the encrypted index entries, is decrypted using a feature encryption key included in the query.

In an optional implementation form of the fourth aspect, the first search methodology and the second search are applied in parallel. Applying the unified search such that the first and second search methodologies are applied in parallel may significantly increase search speed since in particular in light of the fact that each search methodology is applied to a different set of encrypted records.

In an optional implementation form of the fourth aspect, one or more of the encrypted records of the subset are processed to be searchable by the second search methodology. The status indication is updated accordingly. It is highly desired to search as many encrypted records as possible using the second search methodology. Processing the encrypted records of the subset to be searchable using the second search methodology may significantly reduce the number of encrypted records that are searched using the first search methodology.

In a further implementation form of the fourth aspect, the second search methodology uses an encrypted index comprising a plurality of encrypted index entries. The encrypted index mapping the second hash values calculated for each of the features to encrypted records containing these features may significantly increase the search speed and hence yield significantly low response time to queries.

In a further implementation form of the fourth aspect, the encrypted index is periodically updated to include one or more encrypted index entries mapping one or more second hash values calculated based on one or more features extracted from one or more encrypted records of the subset to the one or more encrypted records.

In a farther implementation form of the fourth aspect, the updating of the encrypted index is done by one or more clients of the database. Conducting the encrypted index by the clients) (device(s)) may assure that the data exchanged between the client and the server is always encrypted which may significantly increase data privacy, security and/or integrity.

In a further implementation form of the fourth aspect, the updating of the encrypted index is done by the server. Conducting the encrypted index by the server may allow the service application serving the clients increased flexibility over the records since the data may be received and/or provided to the clients in plaintext.

In an optional implementation form of the fourth aspect, the first and the second search methodologies are applied for a complex query comprising a conjunction of plaintext features, the complex query comprising a plurality of first hash pairs each associated with a respective one of the plaintext features, each first hash pair comprising a slow first bash value calculated for the respective plaintext feature for the first search methodology and a fast first hash value calculated for the respective plaintext feature for the second search methodology, the second search methodology is applied to execute concurrently a plurality of search processes each searching using fast first hash value of one of the plaintext features, at termination of a first search process of the plurality of search processes, the first search methodology is applied to search for a match using the slow first hash value of the remaining plaintext features in a subset of encrypted records identified by the first search process. Supporting complex queries is an essential for a database. Employing the first and the second search methodologies for searching features of the complex queries may significantly reduce the search time and hence the response time to the complex query. This is since the second (faster) search methodology may be applied to each of the features of the complex query in parallel. Then the slow search may be applied only to a set comprising a limited number of encrypted records identified by one of the second (faster) search methodology instances to search for the other features in the encrypted records of the set.

In an optional implementation form of the fifth aspect, the isolated environment is utilized through a hardware enclave. The hardware enclave may provide a highly isolated and secure processing environment.

In an optional implementation form of the sixth aspect, the second key is revoked in case the second client is removed from a list of trusted computing nodes. Revocation of the re-encryption key may not require the cooperation of the client, specifically in case the client is no longer trusted.

In an optional implementation form of the sixth aspect, one or more encrypted records stored in the database are re-encrypted using a rotation key generated from the first key and the second key. Employing the key rotation process may allow for avoiding the decryption altogether so that sensitive keys may not be exposed. Moreover, long and time-consuming download-then-upload process may be avoided.

Unless otherwise defined, all technical ancon scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative is discussion of embodiments of the invention. In this regard, the description taken with the drawings makes apparent to those skilled in the art how embodiments of the invention may be practiced In the drawings.

DETAILED DESCRIPTION

Figure 1:
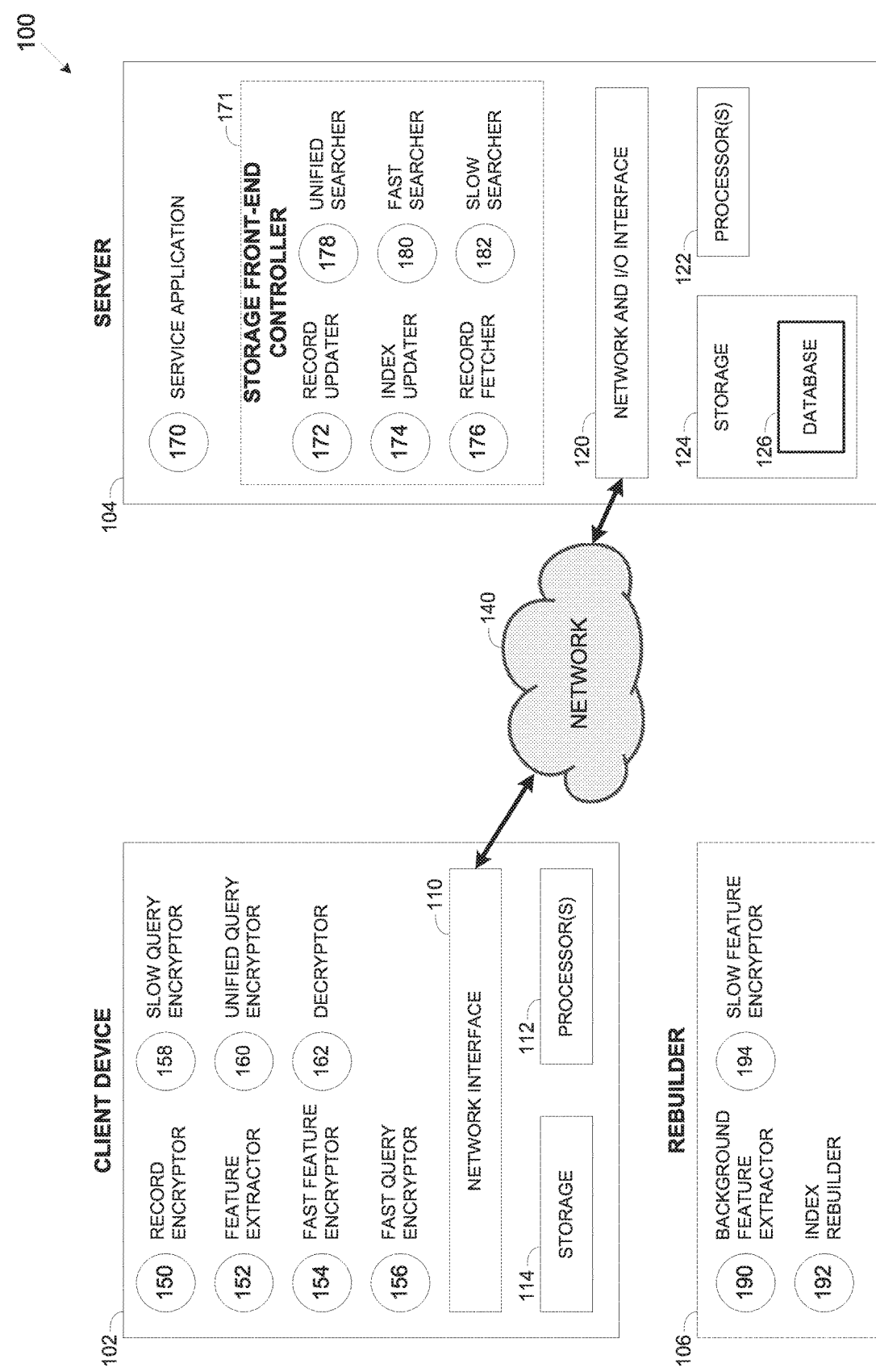
FIG. 1 is a schematic illustration of a first exemplary embodiment of a system for encrypting and searching encrypted data records of a database, according to some embodiments of the present invention.

The present invention, in some embodiments thereof, relates to encrypting, searching and processing encrypted data records of a database and, more specifically, but not exclusively, to encrypting, searching and processing encrypted data records of a database without exposing plaintext data contained in the data records.

Storage and specifically a database may include a plurality of records (i.e. tuples, or entries) each comprising one or more field values each associated with a respective field (column). While the data stored in the database may be owned, used and/or accessed by a plurality of clients, the database may be stored and/or hosted by a service provider which may be exposed to the contents of the database. In order to assure privacy, secrecy and/or integrity of the data, the stored data, specifically the records of the database may be encrypted using encryption keys available only to trusted clients authorized to access this data.

While storing and providing the encrypted records of the database to the clients may be fairly simple, serving queries for searching features, for example, an expression, a character, a string of characters, a sub-string of characters, a symbol, a value, a match of a regular expression, a numeric value and/or the like in the encrypted records may present a major challenge.

According to some embodiments of the present invention, there are provided methods, systems and computer program products for updating and searching encrypted records, in particular updating and searching encrypted records of an encrypted database. Searching for matching feature(s) in the encrypted records may be done by applying a plurality of search methodologies, for example, a first search methodology and a second search methodology. The search speed of the first search methodology may be asymptotically slower than the search speed of the second search methodology. The first search methodology may therefore be applied for searching only a subset of the encrypted records of the database. The selection of the encrypted records searched using the first search methodology may be based on a status of each of the encrypted records indicating whether it supports the first search methodology and/or the second search methodology. Optionally, the two search methodologies are applied in parallel. Optionally, a background process may be applied for processing one or more encrypted records of the subset to support the second search methodology.

Supporting the search functionality through the encrypted records of the database may be subject to two constraints. The first constraint is supporting fast and efficient search to reduce response time (latency) for search queries. Such fast search may be based on identifying and extracting features from each of the records and creating an index serving as a dictionary which maps each of the extracted features to each encrypted record comprising the feature. Updating this index may be time consuming since it may involve processing a large data structure. The fast search may therefore conflict with a second constraint to allow searching any stored encrypted record including recently updated encrypted records which are not yet indexed.

Two terms which are used herein after are first defined. An update of an encrypted record in the database comprises making the encrypted record a searchable encrypted record by extracting one or more features from the record and generating search metadata for the encrypted record based on the extracted features. A search of a feature in the encrypted records comprises identifying encrypted record(s) containing the feature being searched by using the search metadata associated with the searched encrypted record(s).

In order to comply with the two constraints presented herein above, there are provided two record update and feature search methodologies which may be applied separately and/or in conjunction. In the first methodology the record update, i.e. generation of the search metadata (slow-search metadata), designated herein after fast encryption, may be significantly fast while the search, designated herein after slow search, for feature(s) in the slow-search, metadata created using the fast encryption may be significantly slow. In the second methodology the record update, generation of the search metadata (fast-search metadata), designated herein after slow encryption, may be significantly slow while the search, designated herein after fast search, for feature(s) in the fast-search metadata created using the slow encryption may be significantly fast. Analytically, the fast search may be asymptotically faster than the slow search with respect to the number of encrypted records available for searching, for example, the number of encrypted records in the database.

According to some embodiments, the first search methodology may be said to be searching the non-indexed encrypted records, for example, recently updated encrypted records while the second search methodology may be said to be searching the already indexed encrypted records.

Since it is highly desirable to support the fast search for as many encrypted records as possible, a background process for indexing the non-indexed encrypted records may be executed. The background indexing process may be conducted in parallel to other operations in the database, for example, update, search and/or the like such that the other operations are not affected by the background indexing process. After indexing a non-indexed encrypted record and updating the database accordingly, the respective indexed encrypted record may be marked as indexed and supporting the fast search.

The fast encryption supporting the slow search may utilize a slow-search metadata created during the fast encryption for each encrypted record updated in the database. The slow-search metadata may include a hash value calculated for each of the features extracted from the encrypted record. The hash values of the extracted features may then be sorted according to their value to form a sorted hash array for each updated encrypted record. When searching for one or more features in the sorted hash array(s) of the associated updated encrypted records, the queried (searched) feature(s) may be first manipulated, for example, hashed using the same algorithm as used to encrypt (map) the features during the fast encryption. Binary search algorithm may be applied to search for the hash value calculated for the searched feature in the sorted hash array(s).

Searching for the features in the sorted hash array may require O(logN) operations, where N is the number of features. Such search may be significantly more efficient than a sequential search. In addition, the sorted hash array may comprise a single chunk of memory and may thus provide better locality-of-reference and may better fit into cache memory of a processing device thus significantly improving the processing performance. This may be highly advantageous compared, for example, with a binary search tree which may allocate nodes at random (memory) locations. Moreover, using the sorted array may significantly reduce the overhead required for storing the array since no additional metadata is needed for maintaining the array (data structure) compared to existing methods, for example, a hash table, a binary search tree and/or the like which may require excess storage for maintenance.

The slow encryption supporting the fast search may utilize a fast-search metadata. The fast-search metadata may be arranged in an encrypted index maintained for the database which comprises a plurality of encrypted index entries mapping each feature to each encrypted record comprising this feature. Once updated in the encrypted index, the respective encrypted record may be marked as an indexed encrypted record. Searching for one or more features in the encrypted index may utilize a search technique in which the search is conducted in a sequence of search iterations where during each iteration, the feature is hashed using each of a set of values taken from a sequence of values (for example, the sequence of integer numbers), and the hashed values are looked up is the encrypted index. The values from the sequence of values selected during each iteration may be selected. The fast search may therefore significantly reduce the response time.

Simultaneously querying a set of values at once may improve overall response time for searching the database, for example, an Oracle database, a MongoDB database and/or the like which may entail a fixed and large overhead for every query. Moreover, including non-consecutive values in the set of values used in each of the iterations may allow the fast searcher to identify approximately how many more matching encrypted index values are stored in the database, so that the fast searcher may select a larger set of values for the following iteration with high probability that the selected values will indeed return encrypted index values. This may simultaneously optimize the total number of encrypted index entries to be searched for in the database as well as the total number of requests to the database.

The combination of the fast encryption supporting, the slow search and the slow encryption supporting the fast search may allow for optimal response times, both for record update operations and for record search operations. Moreover, by constantly indexing recently updated encrypted records the number of non-indexed records may be maintained significantly low thus allowing use of the fast search for searching the majority of the encrypted records of the database.

The two search methodologies, i.e. the fast search and the slow search may be applied together, optionally in parallel, for example, applying the fast search to search the indexed encrypted records and applying the slow search to search the non-indexed encrypted records. Moreover, the two search methodologies may be used to serve complex queries in which a conjunction of features are searched (i.e. searching for records containing two or more features together). In such case, multiple instances of the fast search may be first applied in parallel for searching each of the conjunction of features in the encrypted index. The fast search instances may terminate upon completion of one of these instances. The fast search instance which completed first may provide a set of encrypted records comprising the respective searched feature. The slow search may then be applied to search the encrypted records of the set.

According to some embodiments of the present invention there are provided systems and methods for key management using Proxy Re-Enctyption (PRE) for serving the encrypted records of the database to a plurality of clients, specifically trusted clients. PRE supports changing a ciphertext encrypted with a first key to a ciphertext encrypted with a second key without decryption, i.e. without being exposed to the contents of the ciphertext. Each client may update the database with one or more encrypted records encrypted using an encryption key shared amongst all clients. When providing an encrypted record of the database to another client, the encrypted record may be first re-encrypted using a PRE method, technique and/or algorithm using a re-encryption key associated with the other client. The other client may decrypt the re-encrypted record using a decryption key corresponding to the re-encryption key used for the re-encryption.

Re-encrypting the encrypted records provided to the clients using the PRE scheme may provide fine-grained control over access to the database for a group of clients. This may be a major advantage over existing methods may lack the ability to manage keys for multiple clients (users). Each client may be independently added or removed from the group by adding and or removing his respective re-encryption key from a repository of re-encryption keys associated with trusted clients. Moreover, clients may be added and/or removed without processing large amounts of encrypted data but rather, only issuing or revoking a single re-encryption key per client. Furthermore, revocation of the re-encryption key may not require the cooperation of the client, specifically in case the client is no longer twisted.

According to some embodiments of the present invention there are provided systems and methods for encrypting a plurality of plaintext field values of a record of the database using a single public nonce which is an arbitrary number and/or expression that may be used only once. Each of the field values is assigned a respective cipher state for initializing a keystream constructed based on the nonce and encrypting the field value using the keystream. The cipher slates may be included in the encrypted record to allow decryption of the encrypted record to obtain the plaintext field values.

Using the single nonce for encrypting the plurality of field values of the record may significantly reduce the amount of storage required for storing the encrypted record. This may be in contrast to an arbitrary encryption schemes, for example, AES, RSA and/or the like which may introduce a fixed amount of overhead per encrypted value. This may present a major advantage compared to existing methods for managing encrypted databases which may not support such reduced storage utilization for storing the multiple encrypted field values of a single record.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to can out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each compacting/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly or the users computer and partly on a remote computer or entirely on the remote computer or server, in the latter scenario, the remote computer may be connected to the user's computer through any type of network, including a local area network (LAN) or a wide area network (WAN), or the connection may be made to an external computer (for example, through the Internet using, an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be Understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary system for encrypting and searching encrypted data records of a database, according to some embodiments of the present invention. An exemplary system 100 for encrypting and searching encrypted data records of a database may include a server 104 providing one or more services to one or more client devices 102. The client devices 102 may communicate with the server 104 through a network 140 comprising one or more wired and/or wireless networks, for example, a local area network (LAN), a wide area network (WAN), a personal area network (PAN), a metropolitan area network (MAN), a wireless LAN (WLAN, e.g. Wi-Fi, etc.), a cellular network, the internet and/or the like. For brevity only one client device 102 is described in the system 100 however this should not be construed as limiting since the system 100 may include a plurality of such client devices 102.

The client device 102, for example, a server computer, a laptop, a personal computer, a notebook computer, a Smartphone, a mobile phone, a tablet computer, a wearable computing device and the like may include a network interface 110, a processor(s) 112 and a storage 114. The client device 102 may further include a user interface comprising one or more human machine interfaces, for example, a keyboard, a pointing device, a display, a touchscreen, an audio interface and/or the like for interacting with one or more users. The network interface 110 may include one or more interfaces, ports, channels, links and/or the like (e.g. a LAN port, a cellular link, etc.) for connecting to the network 140. The processor(s) 112, homogenous or heterogeneous, may include one or more processors arranged for parallel processing, as clusters and/or as one or more multi core processor(s). The storage 114 may include one or more non-transitory non-volatile memory (NVM) and/or persistent storage devices, for example, a hard drive, a solid state drive (SSD), a magnetic disk, a Flash array and/or the like. The storage 114 may also include one or more volatile devices, for example, a Random Access Memory (RAM) component, a cache memory and/or the like.

The processor(s) 112 of the client device 102 may execute one or more software, firmware and/or middleware modules each comprising a plurality of program instructions, for example, an OS, an application, a service, an agent, a tool, a task, a script and/or the like which may be executed by a processor such as the processor(s) 112 from a storage such as the storage 114. The processor(s) 112 may execute for example, a record encryptor 150, a feature extractor 152, a fast feature extractor 154, a fast query encryptor 156, a slow query encryptor 158, a unified query encryptor 160 and for a decryptor 162 collectively designated client computing modules. One or more of the client computing modules may utilize one or more hardware components, circuits and/or the like of the client device 102 for their execution. One or more of the client computing modules may be configured to execute computing tasks and may communicate to exchange data with other devices, applications and/or other computing modules via one or more computerized interfaces which may include the network 140 and/or one or more communication protocols provided by the client device 102, for example, a messaging service, an inter-process (IPC) communication mechanism, a system call, a software library function, an application programming interface (API) function, a Software Development Kit (SDK) function and/or the like.

Optionally, the client device 102 may execute one or more local agents, for example, a web browser, a local agent and/or the like to communicate with the client computing module(s) executed by one or more cloud services, for example Amazon Web Service (AWS), Google Cloud, Microsoft Azure and/or the like.

The server 104, for example, a server computer, a processing node, a cluster of processing nodes, a network node and/or the like may include a network interface 120 such as the network interface 110 for connecting to the network 140, a processor(s) 122 such as the processor(s) 112 and a storage 124 such as the storage 114. The storage 124 may further comprise one or more network storage devices, for example, a storage server, a Network Accessible Storage (NAS), a network drive, and/or the like.

As described for the client device 102, the processor(s) 122 of the server 104 may execute one or more software, firmware and/or middleware modules. The processor(s) 122 may execute for example, a service application 170 which may provide one or more services, applications and/or functionalities to one or more of the client devices 102. The service application 170 may further serve data stored in a database 126, for example, an Oracle database, a MongoDB database and/or the like stored in the storage 124. Optionally, the service application 170 and/or the database 126 are provided by one or more cloud services such as the AWS, the Google Cloud, the Microsoft Azure and/or the like.

The database 126 typically includes a plurality of records, i.e. tuples or entries arranged in fields such that each of the records comprises one or more field values each associated with a respective field.

The database 126 may store data owned, uploaded, downloaded and/or used by the client device(s) 102. This data and/or part thereof may be private, secret, sensitive and/or the like and may not be exposed to other parties other than authorized clients such as the client device 102. Since the server 104, specifically, the service application 170 should not be exposed to the data stored in the database 126, the data stored in the database 126 is encrypted, for example, by the client devices 102 to prevent unauthorized parties from accessing, the data. However, while able to store and provide data of/to the service application 170 serving the client device 102, the database 126 may need to serve queries and/or searches issued by the service application 170 to the database 126. This may present a problem for the database 126 which has no access to the data encrypted in the encrypted records of the database 126. To this end, a storage front-end controller 171 is applied to facilitate and control the connection between the service application 170 and the database 126. In addition to fetching and storing encrypted (data) records in the database 126, the storage front-end controller 171 is adapted to search the encrypted records. As such, the storage front-end controller 171 may support searching for a match of one or more features, for example, an expression, a character, a string of characters, a sub-string of characters, a symbol, a value, a numeric value and/or the like in the encrypted records of the database 126. Each feature may be represented by a respective bit sequence.

The storage front-end controller 171 may include one or More software, firmware and/or middleware modules, for example, a record updater 172, an index updater 174, a record fetcher 176, a unified searcher 178, a fast searcher 180 and a slow searcher 182 collectively designated it) server computing modules. One or more of the server computing modules may utilize one or more hardware components, circuits and/or the like for their execution. One or more of the server computing modules may be configured to execute computing tasks and may communicate to exchange data with other devices and/or other computing modules, for example, other server computing module(s), one or more of the client computing modules, the service application 170 and/or the like. The server computing module(s) may communicate with the other computing module(s) via one or more computerized interfaces which may include the network 140 ands or one or more communication protocols provided by the server 104, for example, a messaging service, an IPC communication mechanism, a system call, a software library function, an API function, an SDK function and/or the like.

The storage front-end controller 171 may typically be hosted by the server 104, for example, as one or more separate applications optionally executed in a separate OS environment provided by the processor(s) 122, as one or more virtual machines (VM) instantiated on the processor(s) 122 and/or the like. In such cases, the server computing module(s) of the storage front-end controller 171 may communicate with the service application 170 via one or more of the one or more of the communication interfaces provided by the server 104, such as the messaging service, the IPC communication mechanism, the system call(s) and/or the like. The server computing module(s) may further communicate with the client computing module(s) via the network 140.

Optionally, the storage front-end controller 171 is executed by a separate server such as the server 104. Optionally, the storage front-end controller 171 is provided by one or more of the cloud services. In such cases, the server computing modules may communicate with each other through one or more computerized interfaces provided by the separate server and/or the cloud services respectively. The server computing modules may further communicate with the service application 170 and/or with the client computing modules via the network 140.

Optionally, one or more of the client devices 102 are utilized by the server 104, specifically, one or more, of the client computing, modules are executed by the processor(s) 122 of the server 104.

The system 100 may further include a rebuilding device 106 for rebuilding the database 126, specifically indexing encrypted records stored in the database 126 to facilitate fast and efficient searching through the encrypted records as described herein after.

In some embodiments of the present invention the, rebuilder 106 may be hosted, implemented and/or utilized by one or more of the client devices 102. Optionally, the rebuilder 106 is hosted, implemented and/or executed at a separate device such as the server 104 and/or by one or more of the cloud services.

The rebuilder 106 may include one or more software, firmware and/or middleware modules, for example, a background feature extractor 190, an index rebuilder 192 and/or a slow feature encryptor 194 collectively designated rebuild computing modules. In case the rebuilder 106 is hosted, implemented and/or utilized by one or more of the client devices 102, one or more of the rebuild computing modules may be executed by the processor(s) 112 of these client device(s) 102.

As described herein above, in order to prevent unauthorized parties from accessing data stored in the database 126, the data is encrypted. The database 126 may typically include a plurality of encrypted records (tuples or entries) each comprising one or more field values arranged in a plurality of fields each assigned with a field identifier (identity). The field identifier may be a set of variable values describing various facets of the intended usage of the records' values (data). The field identity may include, for example, a data type, a maximum length, a field unique identifier, an encryption parameter and/or the like.

The record encryptor 150 executed at the client device 102 may encrypt one or more plaintext data records each comprising one or more field values to create encrypted records which may be uploaded and stored in the database 126.

Figure 2:
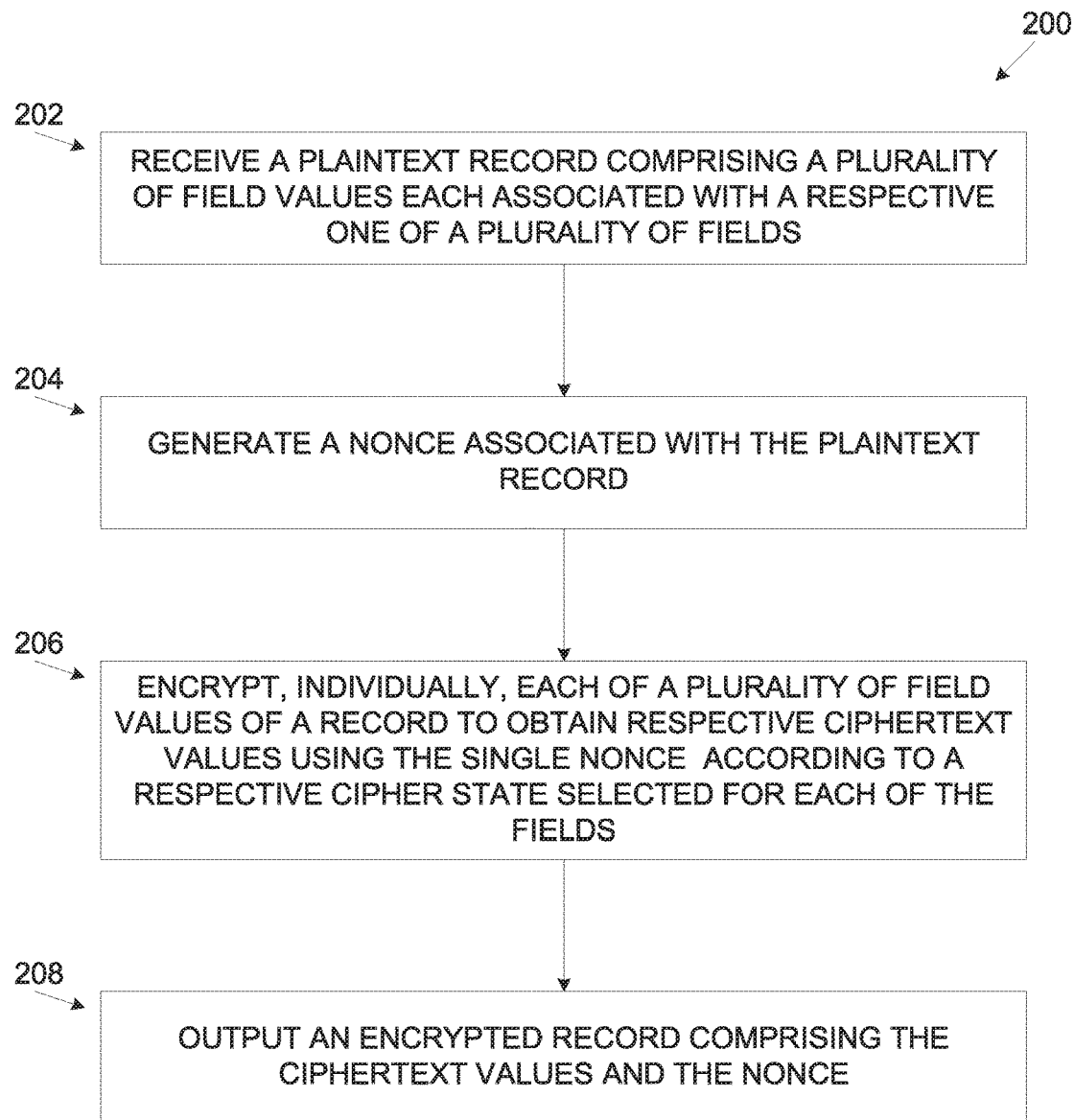
FIG. 2 is a flowchart of an exemplary process of encrypting a plaintext data record using a single nonce, according to some embodiments of the present invention.

Reference is now made to FIG. 2, which is a flowchart of an exemplary process of encrypting a plaintext data record using a single nonce, according to some embodiments of the present invention. An exemplary process 200 for encrypting a plaintext record of a database to create a respective encrypted record may be executed by a record encryptor such as the record encryptor 150 executed by a client device such as the client device 102 in a system such as the system 100.

As shown at 202, the process 200 starts with the record encryptor 150 receive inn a plaintext record comprising one or more plaintext field values, each plaintext field value is associated with a respective field identifier. The record encryptor 150 may further receive an encryption key.

As shown at 204, the record encryptor 150 generates a nonce and associates the nonce with the received plaintext record. The record encryptor 150 may generate a random key and may further generate a record key based on the random key. The record encryptor 150 may generate the nonce based on one or more of the record key, the random key and/or the encryption key. For example, the record encryptor 150 may generate the nonce by encrypting the record key using the encryption key. The encryption key may be a public key in an asymmetric encryption scheme such as, for example, ElGamal, RSA and/or the like. The encryption key may be a secret key in a symmetric encryption scheme such as, for example, Advanced Encryption Standard (AES) and/or the like. The asymmetric encryption scheme may employ elliptic-curve cryptography such as, for example, Curve25519, Secp256k1 and/or the like in order to reduce the size of the record key.

As shown at 206, the record encryptor 150 may encrypt each plaintext field value of the plaintext record to produce a respective ciphertext value. The record encryptor 150 may encrypt each plaintext field value using the nonce and the record key according to a unique cipher state associated with the respective field value thus creating an encrypted record comprising a plurality of ciphertext value(s). The record encryptor 150 may utilize a keystream based on the record key and the nonce according to a stream cipher scheme in order to encrypt the plaintext field values. The cipher state may include an offset within the keystream. The cipher state may include a value which may be used to initialize the keystream. The cipher state may be selected for each of the field values using a plurality of implementations. For example, the cipher state may be generated at random. In another example, the cipher state may be generated based on the field identifier (identity) associated with the respective plaintext field value. The cipher state may be generated based on a sequence of numbers, for example by using integers taken in order from the sequence of non-negative integers and using each such integer as a counter (CTR) value in a CTR mode cipher chaining mode. In another example, the cipher state may be based on cipher states used to encrypt other plaintext field values in the plaintext record. The record encryptor 150 may include an indication of the cipher state in the encrypted record.

Using the record key, the record encryptor 150 may significantly reduce the amount of storage required for storing the encrypted record. This may be in contrast to an arbitrary encryption schemes which may introduce a fixed amount of overhead per encrypted value. For example, RSA may require at least 117 bytes for each encrypted value. By encrypting only the record key field using the arbitrary encryption scheme, the overhead of the arbitrary encryption scheme may occur only once for all the fields of the encrypted record. The total size of the ciphertext values produced using the keystream may therefore be exactly the total size of the plaintext values.

Optionally, the record encryptor 150 includes an authentication tag in the ciphertext values(s). The authentication tag may be used to ensure the integrity (i.e. accuracy and consistency) of the plaintext values(s) during decryption.

As shown at 208, the record encryptor 150 may generate an upload record comprising the ciphertext value(s) and the nonce and may output the upload record. The record encryptor 150 may further generate an upload wrapper based on the encrypted record. The record encryptor 150 may include in the upload wrapper an indication of which items are included in the upload wrapper. For example, the record encryptor 150 may include in the upload wrapper a type field indicative of the type of the encrypted record and/or of a type of one or more of the ciphertext values included in the encrypted record. The record encryptor 150 may further include the nonce and/or other types of data generated by the record encryptor 101 in the upload wrapper. The record encryptor 150 may include the upload wrapper in the upload record. The record encryptor 150 may transmit the upload record to a record updater such as the record updater 172 of a storage front-end controller such as the storage front-end controller 171. The record updater 172 may update the upload record in a database such as the database 126.

Using the upload wrapper may allow for including additional data necessary for working with encrypted data without adapting the service application such as the service application 170 to support receiving and storing such additional data. This may allow for a significantly faster and/or more efficient integration and/or adoption of the encryption functionality into legacy systems.

In order for the storage front-end controller 171 to be able to search for a match of one or more features in the encrypted records of the database 126, the encrypted record needs be searchable. This may be done by extracting features found in the plaintext records and creating a search metadata structure associated with the encrypted record. The storage front-end controller 171 may thus process a query for matching one or more features by searching for the queried feature(s) in one or more of the data structures associated with the encrypted records.

Creating the search metadata structures may be done by employing two record update methodologies separately or in conjunction. In a first record update methodology, designated fast encryption herein after, the search metadata structure (slow-search metadata) mapping the extracted features may be quickly created. In a second record update methodology, designated slow encryption herein after, the search metadata structure (fast-search metadata) mapping the extracted features may be created in significantly slower process which may entail a large processing overhead. The fast encryption may allow fast update of the database 126 with new encrypted records while supporting searching for the features in the slow-search metadata structure is done in a relatively slow search speed using a first search methodology designated slow search herein after. The slow encryption on the other band may be time consuming for updating new encrypted records in the database 126, i.e. creating the fast-search metadata structure mapping the extracted features while it may support searching for the features in fast-search metadata structure in a fast search speed using a second search methodology designated fast search herein after.

The slow encryption may support searching for the features in an asymptotically faster search speed by applying the fast search. The fast search may accommodate the high speed search by employing various rich search methodologies and/or functionality over the encrypted records. The fast search may therefore significantly increase search performance compared to other search methodologies.

Naturally it may be highly desirable to apply the fast search for searching the features in the encrypted records. However, since the slow encryption may be time consuming, some of the encrypted records, for example, encrypted records which are recently uploaded and updated in the database 126 may not support the fast search since the fast-search metadata structure may not be available for them.

In order to overcome this limitation, such encrypted records which have not undergone the slow encryption process are searched by applying the slow search.

The feature extraction may be conducted by a feature extractor such as the feature extractor 152 which may be executed at the client device 102. The feature extractor 152 may receive the plaintext record from the record encryptor 150. The feature extractor 152 may extract from the plaintext record one or more plaintext features each represented by a respective bit sequence. The features may include, for example, an expression, a character, a string of characters, a sub-string of characters, a symbol, a value, a numeric value and/or the like.

Optionally, when extracting the features, the feature extractor 152 first normalizes one or more of the plaintext values of the plaintext record according to one or more normalization rules to provide respective normalized value(s). For example, according to a certain normalization rule, the feature extractor 152 may convert all characters in a plaintext value to a single letter case. In another example, according to another normalization rule, the feature extractor 152 may replace a sequence of characters with an equivalent sequence of characters, for example converting all occurrences of "ae" to "a". In another example, according to another normalization rule, the feature extractor 152 may apply a stemming algorithm such as, for example, Porter2, Soundex, and/or the like. The feature extractor 152 may apply none or one or more of the normalization rules to normalize each of the plaintext values.

The feature extractor 152 may generate multiple types of plaintext features. For example, the feature extractor 152 may generate a plaintext feature for a word occurring in the normalized value. In another example, the feature extractor 152 may generate a plaintext feature for a sub-string of a word occurring in the normalized value. The feature extractor 152 may be further configured to avoid generating plaintext features for one or more plaintext values detected in the normalized value. For example, the feature extractor 152 may to avoid generating a plaintext feature based on a length of a word. In another example, the feature extractor 152 may avoid generating a plaintext feature based on a word being included in a set of stop-words. In another example, the feature extractor 152 may generate a plaintext feature for a sequence of words occurring in the normalized value, and may further avoid generating a plaintext feature based on separator characters occurring between words in the normalized value.

The fast encryption may be conducted by a fast feature encryptor such as the fast feature encryptor 154 executed at the client device 102. The fast feature encryptor 154 may generate the slow-search metadata at a significantly fast speed. The fast feature encryptor 154 may receive from the feature extractor 150 a set of plaintext features extracted form a plaintext record. The fast feature encryptor 154 may further receive a slow search key and the nonce generated by the record encryptor 150 and associated with the (plaintext) record. The fast feature encryptor 154 may apply a first pseudo-random function PRF1 using the slow search key on each plaintext feature in the set of plaintext features to provide a set of first hash values. The fast feature encryptor 154 may apply a second pseudo-random function PRF2 using the nonce on each of the first hash values to provide a set of second hash values. The fast feature encryptor 154 may generate the slow-search metadata structure based on the set of second hash values. The fast feature encryptor 154 may include the nonce in the slow-search metadata. The fast feature encryptor 154 may optionally sort the set of second hash values according to their value to provide a sorted hash array for the record and may include the sorted hash array in the slow-search metadata. The slow-search metadata, the nonce and/or one or more other types of data generated by the record encryptor 150 are collectively designated encryption metadata herein after.

Using the sorted array may significantly reduce the overhead required for storing the array since no additional metadata is needed for maintaining the array (data structure) compared to existing methods, for example, a hash table, a binary search tree and/or the like which may require excess storage 110 to maintain the pointers or hash buckets for the data structure.

The fast feature encryptor 154 may provide the encryption metadata to the record encryptor 150 which may include the encryption metadata in the upload wrapper attached to the upload record transmitted to the record updater 172.

The record updater 172 receiving the upload record may extract the encryption metadata from the upload wrapper included in the upload record. The record updater 172 may extract one or more ciphertext values from the upload record. The record updater 172 may generate an encrypted record including one or more storage items, for example, a ciphertext value included in the upload record. The storage item may comprise one or more items of the encryption metadata. The storage item may further comprise a record identifier. The record updater 172 may update the database 126 with the encrypted record. The record updater 172 may further store the encryption metadata associated with the encrypted record, specifically the associated slow-search metadata structure comprising the sorted hash array. The record updater 172 may mark the encrypted record as a non-indexed encrypted record indicating that the encrypted record has not undergone the slow encryption as described herein after and is hence not indexed. For example, the record updater 172 may mark the encrypted record as a non-indexed encrypted record by setting a non-index status flag in the encrypted record. Optionally, in case the set of second hash values included in the encryption metadata is not sorted by the fast feature encryptor 154, the record updater 172 may sort the set of second hash values according to their value to provide the sorted hash array for the encrypted record. The record updater 105 may include the sorted hash array in the encrypted record and may update the encrypted record in the database 126.

The slow encryption may be conducted by a slow feature encryptor such as the slow feature encryptor 194 which may be executed at a rebuilding device such as the rebuilding device 106. As described herein above, according to some embodiments of the present invention, one or more of the client devices 102 may host, utilize and/or execute the rebuilder 106 such that the slow feature encryptor 194 is executed at the client device 102. In such embodiments, a background feature extractor such as the background feature extractor 190 and/or an index rebuilder such as the index rebuilder 192 may also be executed at the client device(s) 102. Moreover, as the background feature extractor 190 operates similarly to the feature extractor 152, in such embodiments, the background feature extractor 190 is not applicable as the feature extractor 152 may replace it.

The index rebuilder 192 may periodically initiate a rebuilding process to apply indexing to one or more non-indexed, encrypted records of the database 126. For example, the rebuilding process may be initiated based on the time passed since a previous rebuilding process. In another example, the rebuilding process may be initiated based on a count (number) of non-indexed encrypted records detected in the database 126. The rebuilding process may be executed in the background simultaneously and without interfering with standard search and update operations to the database 126. Search and/or update operations initiated by a plurality of clients such as the client device 102 may therefore not be paused, slowed and/or interrupted during the rebuilding process.

During the rebuilding process, the index updater 192 may retrieve a set of one or more rebuild records from the database 126 where each rebuild record may be based on respective non-indexed encrypted record. The rebuild record may include at least a subset of the storage items included in the encrypted record. The index rebuilder 192 may generate a set of plaintext features for each of the rebuild records. The index rebuilder 192 may use the background feature extractor 190 to extract the set of plaintext features. The background feature extractor 190 may operate substantially similar to the feature extractor 152. As described herein above, in case the rebuilding process is conducted by the client devices) 102, the index rebuilder 192 may use the feature extractor 152 to extract the set of plaintext features.

For each rebuild record, the index rebuilder 192 may provide the corresponding set of plaintext features and the record identifier of the rebuild record to the slow feature encryptor 194. The index rebuilder 192 may generate a new empty index blob. Alternately, the index rebuilder 192 may retrieve the index blob from the database 126. The index rebuilder 192 may provide the index blob to the slow feature encryptor 194. The slow feature encryptor 194 may generate a new index blob. The slow feature encryptor 194 may generate a fast-search metadata at a slow encryption speed. The slow encryption speed may be asymptotically slower than the fast encryption speed of the fast encryption conducted by the first feature encryptor 154 with respect to the number of encrypted records stored in the database 126.

The slow feature encryptor 194 may receive the set of one or more update records. Each update record may correspond to a respective one of the rebuild records. Each update record includes a set of plaintext features extracted from the respective rebuild record and a record identifier of the rebuild record. The slow feature encryptor 194 may receive and update the fast-search metadata structure comprising a feature-counter map of the database 126 which maps plaintext features to counters. The slow feature encryptor 194 may receive a first fast search key. The slow feature encryptor 194 may receive a second fast search key. The slow feature encryptor 194 may receive a blob encryption key, a blob decryption key and an index blob.

The slow feature encryptor 194 may decrypt the index blob using the blob decryption key to provide a feature-counter map from a plaintext feature to a counter. The slow feature encryptor 194 may use a sequence of values to provide counter values, for example, the sequence of non-negative integers. For each plaintext feature in the set of plaintext features, the slow feature encryptor 108 may look up the plaintext feature in the feature-counter map to provide a counter value. If the look up returns no values, the slow feature encryptor 194 may add the plaintext feature and the first value in the sequence of values to the feature-counter map, and set the counter value to the first value. If the look up returns a mapped value, the slow feature encryptor 194 may set the counter value to the value immediately following the mapped counter value in the sequence of values, and may update the feature-counter map with the plaintext feature and the counter value.

The slow feature encryptor 194 may apply a pseudo-random function PRF10 using the first fast search key on each plaintext feature to calculate (provide) a first hash value associated with the respective plaintext feature. The slow feature encryptor 194 may apply a pseudo-random function PRF11 on the first hash value and on the counter value to provide a second hash value associated with the respective plaintext feature. The slow feature encryptor 194 may generate an update entry based on the second hash value and on the record identifier included in the update record in which the plaintext feature is included. The slow feature encryptor 194 may apply a pseudo-random function PRF12 on the second fast search key and on the plaintext feature to obtain a feature encryption key. The slow feature encryptor 194 may encrypt the record identifier using the feature encryption key to provide an encrypted identifier, and may include the encrypted identifier in the update entry. The slow feature encryptor 194 may generate an index update request including a set of update entries. The slow feature encryptor 194 may encrypt the modified feature-counter map using the blob encryption key to provide an encrypted feature-counter map. The slow feature encryptor 194 may generate the fast-search metadata which may include a set of updated record identifiers. The slow feature encryptor 194 may include the fast-search metadata in the index update request.

An index updater such as the index updater 174 of the storage front-end controller 171 may create and/or update an encrypted index comprising the fast-search metadata for the database 126. The encrypted index may be a data structure comprising a plurality of encrypted index entries each mapping a respective one of the plurality of slow-encrypted features to one of the encrypted records containing the respective feature. The data structure used for the encrypted index may be adapted for fast lookup and/or fast insertion, for example, a B-Tree, a hash table, a binary search tree and/or the like. The index updater 109 may store the encrypted feature-counter map in the storage 110.

The index updater 174 may receive the index update request from the slow feature encryptor 194. As described herein above, the index update request may include a set of update entries, may include an encrypted feature-counter map and may include a set of updated record identifiers. The index updater 174 may extract the fast-search metadata from the index update request. The index updater 174 may extract the new index blob and may update it in the database 126. The index updater 174 may indicate to the database 126 that the respective update records are now indexed encrypted records. For example, the index updater 174 may mark the encrypted record as an indexed encrypted record indicating that the encrypted record is now indexed. For example, the index updater 174 may mark the encrypted record as an indexed encrypted record by setting an index status flag in the encrypted record.

Maintaining the encrypted index and the sorted hash arrays may allow for applying the fast search methodology and the slow search methodology respectively for searching one or more features in the encrypted records of the database 126.

The number of non-indexed encrypted records may depend on the time duration required for the index updater 174 to process each non-indexed encrypted record and/or on the frequency of the rebuilding processes.

One or more clients, for example, the client device 102 may issue one or more queries to the storage front-end controller 171 for searching for a match of one or more features in the encrypted records of the database 126.

According to some embodiments of the present invention the search for matching features in the encrypted records may be done by applying two search methodologies, a first search methodology and a second search methodology. The search speed of the first search methodology may be asymptotically slower than the search speed of the second search methodology. The first search methodology may therefore be applied for searching only a subset of the encrypted records of the database 126. The selection of the encrypted records searched using the first search methodology may be based on a status of each of the encrypted records indicating whether it supports the first search methodology and/or the second search methodology. Optionally, the two search methodologies are applied in parallel. Optionally, a background process may be applied for processing one or more encrypted records of the subset to support the second search methodology.

For example, the first search methodology may be the slow search while the second search methodology may be the fast search. In such case the set of encrypted records may include the non-indexed records. The first search methodology, i.e. the slow search may therefore be applied for searching the subset of non-indexed encrypted records while the second search methodology, i.e. the fast search may be applied for searching the indexed encrypted records. The non-indexed and/or the indexed encrypted records may be identified according to their associated non-index status flag and/or index status flag. In such embodiments, the background process may be conducted by the index rebuilder 192 and the index updater 174 to index the non-indexed encrypted records.

One or more of the queries issued by the client device 102 may be managed by a unified query encryptor such as the unified query encryptor 160.

The unified query encryptor 160 may receive a plaintext query. The unified query encryptor 160 may build a plaintext query expression including a set of one or more plaintext features and optionally combining operators. The combining operators may include, for example, AND, OR, and NOT operators. The unified query encryptor 160 may forward the plaintext query expression to a slow query encryptor such as the slow query encryptor 158 and/or to a fast query encryptor such as the fast query encryptor 156.

The slow query encryptor 158 may receive a slow search key and the Plaintext query expression and may generate a slow query token based on the slow search key and the plaintext query expression. The slow query token may include one or more slow-encrypted features and optionally operators corresponding to the plaintext feature(s) and operator(s) included in the plaintext query expression. The slow query encryptor 158 may extract one or more plaintext feature from the plaintext query expression. The slow query encryptor 158 may apply the first pseudo-random function PRF1 using the slow search key on each plain text feature of the plaintext query expression to obtain a first hash value for each of the plaintext features. The slow query encryptor 158 may include the first hash value(s) in the slow query token.

The fast query encryptor 156 may receive a fast search key and the plaintext query expression and may generate a fast query token based on the fast search key and the plaintext features of the plaintext query expression. The fast query token may include one or more fast-encrypted features and optionally operators corresponding to the plaintext feature(s) and operator(s) included in the plaintext query expression.

Figure 3:
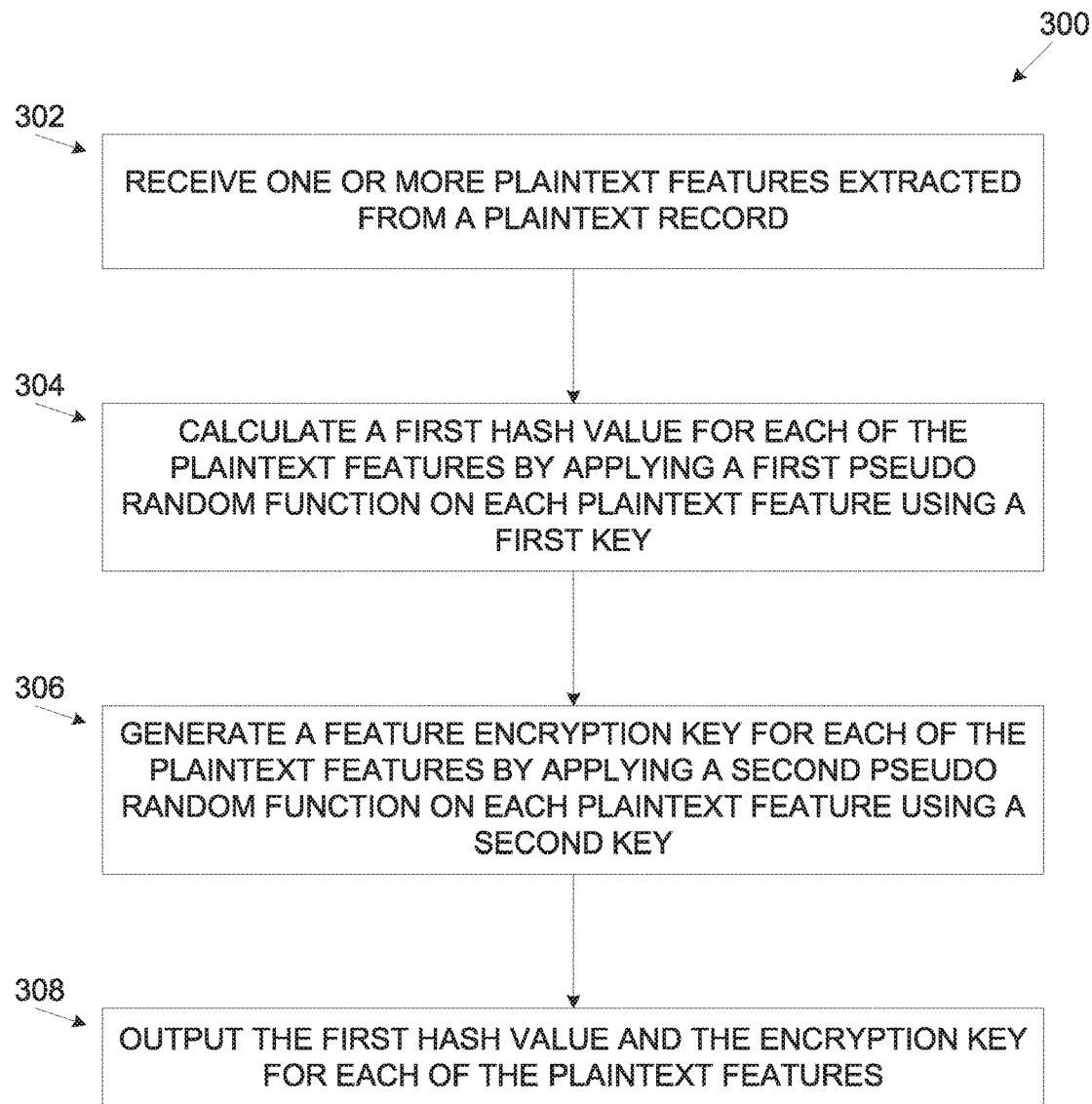
FIG. 3 is a flowchart of an exemplary process of creating a query for searching feature(s) in a plurality of encrypted data records of a database, according to some embodiments of the present invention.

Reference is now made to FIG. 3, which is a flowchart of an exemplary process of creating a query for searching feature(s) in a plurality of encrypted data records of a database, according to some embodiments of the present invention. An exemplary process 300 may be executed by a fast query encryptor such as the fast query encryptor 156 for creating an encrypted query constructed liar fast searching of one or more features in encrypted records of a database such as the database 126.

As shown at 302, the process 300 starts with the fast query encryptor 156 receiving one or more plaintext features, for example, extracted front the plaintext query expression. The fast query encryptor 156 may receive a first fast search key and may further receive a second fast search key.

As shown at 304, the fast query encryptor 156 may apply the pseudo-random function PRF10 on the first fast search key and each of the plaintext features to calculate (provide) a first hash value. The fast query encryptor 156 may include the first hash value in the fast query token.

As shown at 306, the fast query encryptor 156 may apply the pseudo-random function PRF12 on the second fast search key and on the plaintext feature to provide a feature encryption key. The fast query encryptor 156 may include the feature encryption key in the fast query token.

As shown at 308, the fast query encryptor 156 may construct and output the fast query token comprising the first hash value and the feature encryption key for each of the queried plaintext features.

The unified query encryptor 160 may generate a unified query token based on the slow query token and the fast query token. The unified query token may be generated by replacing each plaintext feature of the plaintext query expression with a tulle including a fast-encrypted feature from the fast query token and a slow-encrypted feature from the slow query token. The unified query encryptor 160 may transmit the unified query token to a unified searcher such as the unified searcher 178.

The unified searcher 178 receiving the unified query token may forward the slow query token extracted from the unified query token to a slow searcher such as the slow Searcher 182. The unified searcher 178 may further forward the fast query token extracted from the unified query token to a fast searcher such as the fast searcher 180.

The slow searcher 182 and/or the fast searcher 180 may search the database 126 of encrypted records to provide identifiers of encrypted records matching the plaintext query. Each of the slow searcher 182 and/or the fast searcher 180 may search a subset of the encrypted records of the database 126, in particular the slow searcher 182 may search the non-indexed encrypted records and the fast searcher 182 may search the indexed encrypted records.

Figure 4:
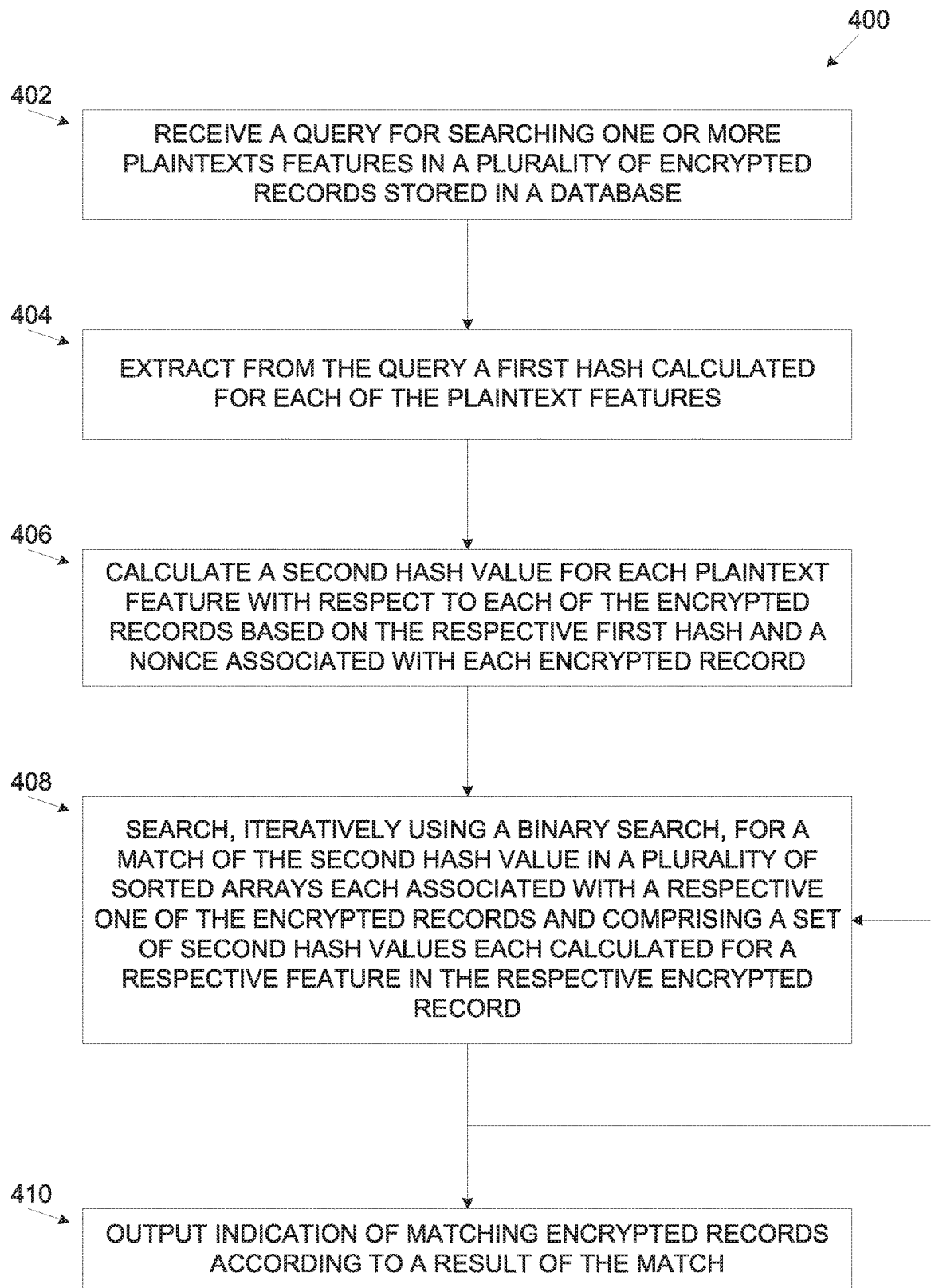
FIG. 4 is a flowchart of an exemplary first search methodology for searching feature(s) in a plurality of encrypted data records of a database, according to some embodiments of the present invention.

Reference is now made to FIG. 4, which is a flowchart of an exemplary first search methodology for searching feature(s) in a plurality of encrypted data records of a database, according to some embodiments of the present invention. An exemplary process 400 may be executed by a slow searcher such as the slow searcher 182 for searching one or more features in encrypted records of a database such as the database 126.

As shown at 402, the process 400 starts with the slow searcher 182 receiving a query, specifically the slow query token.

As shown at 404, the slow searcher 182 may extract from the slow query token a set of one or more first hash values calculated by a slow query encryptor such as the slow query encryptor 158 for each of the queried plaintext features.

As shown at 406, the slow searcher 182 may examine (analyze) the slow search metadata included in each of a subset of encrypted records of the database 126, for example, the subset may comprise one or more non-indexed encrypted records. For every examined encrypted record, the slow searcher 182 may apply the second pseudo-random function PRF2 using the nonce associated with the encrypted record and the first hash value to obtain a second hash value for each first hash value.

As shown at 408, the slow searcher 182 may apply binary search to search each second hash value in the sorted hash array associated with each encrypted record of the set of encrypted records. Wherein as described herein above, each of the sorted hash arrays comprises a set of second hash values calculated for the plaintext features identified and extracted from the respective encrypted record and sorted according to their value. The binary search may employ, for example, the algorithm employed by the function std::binary_search( ) of the C++ programming language specification.

As shown at 410, the slow searcher 182 may output an indication of matching encrypted records comprising the queried plaintext feature(s). For example, the slow searcher 182 may output a set of result identifiers, and may include a record identifier associated with the database 126 in the set of result identifiers record if the binary search algorithm(s) indicates that the second hash value was found in one or more of the sorted hash arrays. The slow searcher 182 may further issue a fetch request comprising the record identifier(s) of the matching encrypted record(s) for fetching the matching encrypted record(s).

Searching for the features in the sorted hash array may require O(logN) operations, where N is the number of features. Such search may be significantly more efficient than a sequential search. In addition, the sorted hash array may comprise a single chunk of memory and may thus provide better locality-of-reference and may better fit into cache memory of a processor such as the processor(s) 112,122 and/or 132. This may be highly advantageous compared, for example, with a binary search tree which may allocate nodes at disparate (memory) locations.

Figure 5:
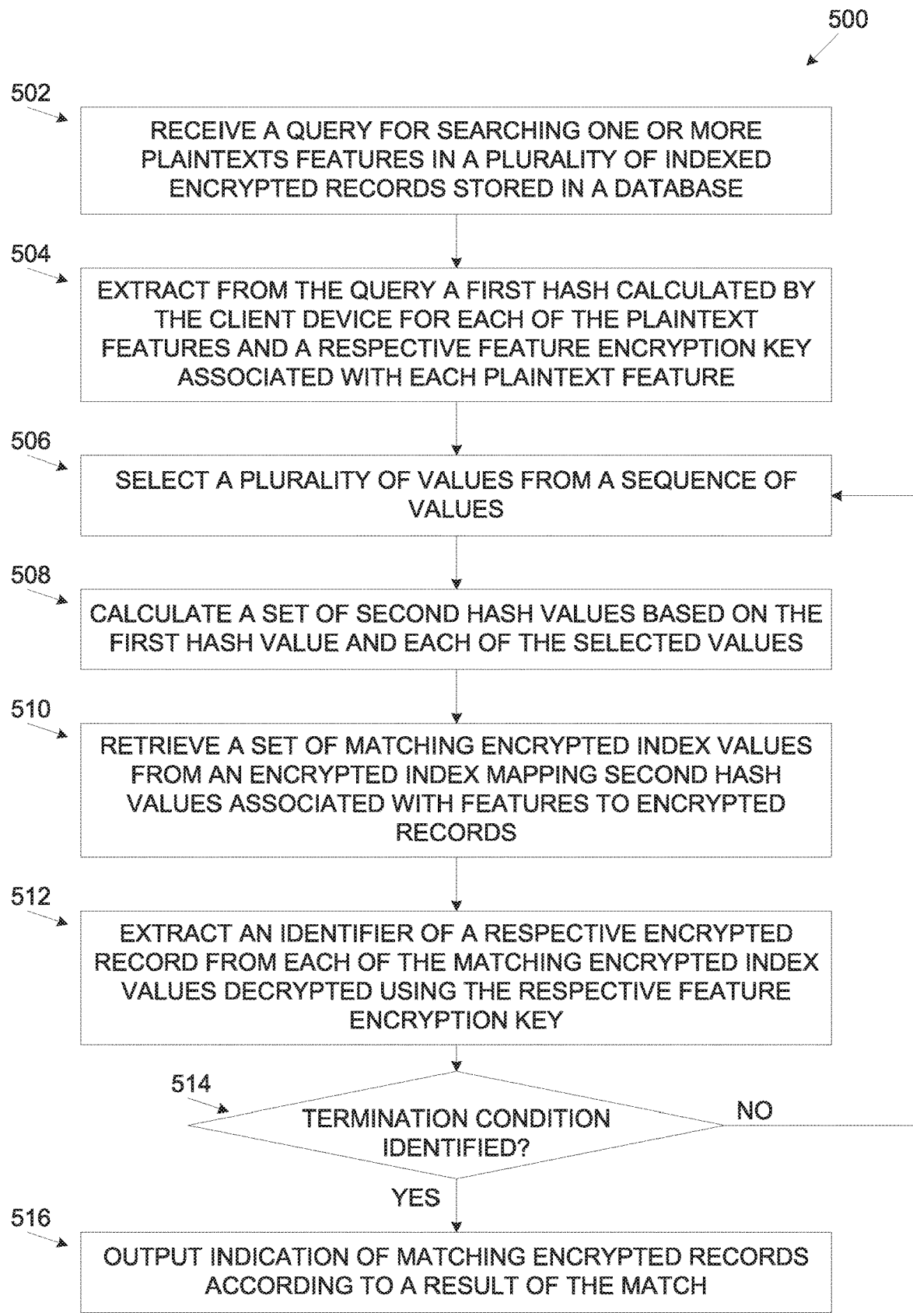
FIG. 5 is a flowchart of an exemplary second search methodology for searching feature(s) in a plurality of encrypted data records of a database, according to some embodiments of the present invention.

Reference is now made to FIG. 5, which is a flowchart of an exemplary second search methodology for searching feature(s) in a plurality of encrypted data records of a database, according to some embodiments of the present invention. An exemplary process 500 may be executed by a fast searcher such as the fast searcher 180 for searching one or more features in encrypted records of a database such as the database 126. The fast searcher 180 may search the encrypted index to identify encrypted records which match the queried plaintext feature(s). The fast searcher 180 may apply an iterative search process comprising a plurality of search aerations which may be optimized to reduce the number of iterations.

As shown at 502, the process 500 starts with the fast searcher 180 receiving a query, specifically the fast query token.

As shown at 504, the fast searcher 180 may extract from the fast query token one or more first hash values calculated by a fast query encryptor such as the fast query encryptor 156 for each of the queried plaintext features. The fast searcher 180 may further extract one or more feature encryption key created by the fast query encryptor 156 wherein each of the feature encryption key is associated with a respective one of the queried plaintext features.

As shown at 506, the fast searcher 180 may select a plurality of values which may be used for the search in the encrypted index. The fast searcher 180 may generate an empty set of values. The fast searcher 180 may add to the empty set a plurality of values selected from a sequence of values which may be based on the iteration number. The selected values may be further based on one or more sets of values generated during one or more previous iterations. The selected values may be further based on results obtained from the database 126 during one or more previous iterations.

The fast searcher 180 may include in the set values selected and/or generated in a manner that will reduce the number of loop iterations, while simultaneously keeping the total number of encrypted index look up operations proportional to the number of encrypted index entries found for the database 126. For example, the fast searcher 180 may add all the values at position $[2^i, 2^{i+1}]$ at the sequence of values, wherein i is the iteration number. For example, at iteration i the fast searcher 180 may include in the set of integers all the integers which haven't been included in previous iterations, and which are smaller than the largest integer from a previous iteration for which a corresponding encrypted index entry was found in the encrypted index. For example, the fast searcher 180 may include in the set of values a set of non-consecutive values from the sequence of values appearing after the last integer from a previous iteration for which a corresponding encrypted index entry had been found. For example, the sequence of values is the sequence of non-negative integers, and when in previous iterations encrypted index entries had been found for all the numbers 0, 1, 2, 3, 4, 8, 16, with 16 being the last value from a previous iteration for which a corresponding encrypted index entry had been found, the fast searcher 116 may include the numbers 5, 6, 7, 9, 10, 11, 12, 13, 14, 15, 32, 64 in the set of integers, where 5, 6, 7, 9, 10, 11, 12, 13, 14, 15 are the set of all integers preceding 16 and not included in previous iterations, and 32, 64 are a set of non-consecutive integers appearing after than 16.

As shown at 508, the fast searcher ISO may calculate (generate) a set of second hash values using the pseudo-random function PRF11 applied to each of the first hash values included in the fast query token and each, of the values of the set of selected values for the current iteration.

As shown at 510, the fast searcher 180 may retrieve from the encrypted index a set of encrypted index values mapping second hash values to encrypted record(s) and corresponding to the set of values selected for the current iteration.

As shown at 510, the fast searcher 180 may decrypt the retrieved encrypted index values using the feature encryption key associated with the respective queried feature.

As shown at 512, the fast searcher 180 may extract and provide record identifiers based on the retrieved encrypted index entries. For example, the fast searcher 180 may use encrypted index values as record identifiers.

As shown at 514, which is a condition step, the fast searcher 180 may branch to 516 in case one or more termination conditions are identified. The fast searcher 180 may branch to 506 to initiate another search iteration in case the more termination conditions are not met (fulfilled).

A first termination condition may dictate that the fast searcher 180 terminates the search in case the set of encrypted index values is empty.

A second termination condition may dictate that the fast searcher 180 proceeds to 506 in case the set of encrypted index values includes encrypted index values corresponding to all of the values in the set of values. The second termination condition may further dictate that the fast searcher 180 may perform a last (final) search iteration which may be conducted using a set of values comprising all values from the sequence of values which were not included in previous set(s) of values and are preceding the first value in the sequence of values for which a corresponding encrypted index value has not been found. The last search iteration may be indicated, for example, by setting a last iteration flag which may be checked by the fast searcher 180 at step 514.

As shown at 516, the fast searcher 180 may output an indication of matching encrypted records comprising the queried plaintext feature(s). For example, the fast searcher 180 may output the record identifier identified in step 512. The fast searcher 180 may further issue a fetch request comprising the record identifier(s) of the matching encrypted record(s) for fetching the matching encrypted record(s).

Simultaneously querying a set of values at once may improve overall response time for searching a database such as the database 126, for example, an Oracle database, a MongoDB database and/or the like which may entail a fixed and large overhead for every query.

Moreover, including non-consecutive values in the set of values used in each of the search iterations may allow the fast searcher 180 to identify approximately how many more matching encrypted index values are stored in the database 126, so that the fast searcher 180 may select a larger set of values for the following search iteration with reasonable probability that the selected values will indeed return encrypted index values. This algorithm applied by the process 500 may therefore simultaneously optimize the total number of encrypted index entries to be searched for in the database 126 and the total number of requests to the database 126. The penalty for such an algorithm may be extra look up operations, i.e. more than one encrypted index key query that will return no encrypted index values. In order to keep the total number of extra look up operations small, the non-consecutive values from the sequence of values should be selected to be not very far from the last consecutive value that was queried. The maximal number of extra look up operations is the difference between the last consecutive value with an encrypted index value and the first non-consecutive value without an encrypted index value.

The combination of the fast feature encryptor 154 working with the slow searcher 182 using the slow query token and the slow feature encryptor 108 working with the fast searcher 180 using the fast query token may allow for optimal response times, both for record update operations and for record search operations. The index rebuilder 192 in conjunction with the record updates 172 may continuously index non-indexed encrypted records thus moving such records from being processed by the slow searcher 182 to being processed by the fast searcher 180, while keeping search functionality available even on newly updated encrypted records which are still non-indexed. The number of records processed by the slow searcher 182 may therefore be kept significantly small. At the same time, update speed is usually fast because only the fast feature encryptor 154 is called during a record update operation.

A unified searcher such as the unified searcher 178 may receive a complex query which may include a plurality of queried features and one or more conditional operators. The unified searcher 178 may detect conjunction sub-expressions in the unified query token, i.e., sub-expressions containing only AND and NOT operators. The unified searcher 178 may forward the complex query, specifically the fast search token comprising multiple fast-encrypted features to the fast searcher 180. The fast searcher 180 may search in parallel for encrypted records, specifically indexed encrypted records matching each fast-encrypted feature. The fast searcher 180 may stop searching when searching one of the fast-encrypted features is complete, wherein this fast-encrypted feature is called the limiting feature. The unified searcher 178 may then pass a first set of record identifiers associated with encrypted records matching the limiting feature to the slow searcher 182. The slow searcher 182 may then search each encrypted record associated with each record identifier of the first set of record identifiers to provide a second set of record identifiers. The unified searcher 178 may then provide the final set of record identifiers, based on the second set of record identifiers.

The unified searcher 178 may provide an optimal search speed for plaintext queries including multiple search features in conjunction. For example, assuming a plaintext query comprising the following plaintext query expression "dog AND tapir" is searched in the database 126 which comprises 100,000 encrypted records with the value "dog", 10 encrypted records with the value "tapir" and 2 encrypted records with both values. Thus, the fast searcher 180 may quickly complete searching and provide all 10 records matching the queried feature "tapir" and the slow searcher 182 may need to search only these 10 records for the feature "dog", ultimately resulting in the 2 records containing both features.

A record fetcher such as the record fetcher 176 may receive the fetch request for fetching one or more of the encrypted records from the database 126. The record fetcher 76 may retrieve one or more encrypted records each comprising a record key and one or more ciphertext values. The record fetcher 176 may generate a download wrapper for each of the encrypted records based on the record key and on the ciphertext value(s) of the encrypted record. The record fetcher 176 may include an identifier in the download wrapper, for example a prefix string, a prefix string and a suffix string and/or the like. The record fetcher 176 may output the download wrapper. For example, the record fetcher 176 may output (provide or transmit) the encrypted record(s) and their associated download wrapper(s) to the client device 102 which issued the query to the unified searcher.

A decryptor such as the decryptor 162 of the querying client device 102 may receive, from the record fetcher 176, the download wrapper(s) and may extract and a decryption key from each of the download wrappers. The decryptor 162 may decrypt the ciphertext value(s) included in the downloaded wrapper using the decryption key to obtain the respective plain-text value(s). The decryptor 162 may receive a document including a set of download wrappers, wherein each download wrapper includes an identifier, and find the download wrappers by searching for the identifiers in the document.

The identifier included in the download wrapper may allow legacy applications to decrypt data downloaded to the client device 102 without requiring modifications to such existing applications hence significantly reducing the integration effort, resources and/or time for integrating the encryption functionality into existing applications.

According to some embodiments of the present invention, the feature encryption, both the fast encryption and the slow encryption is done by the storage front-end controller.

Figure 6:
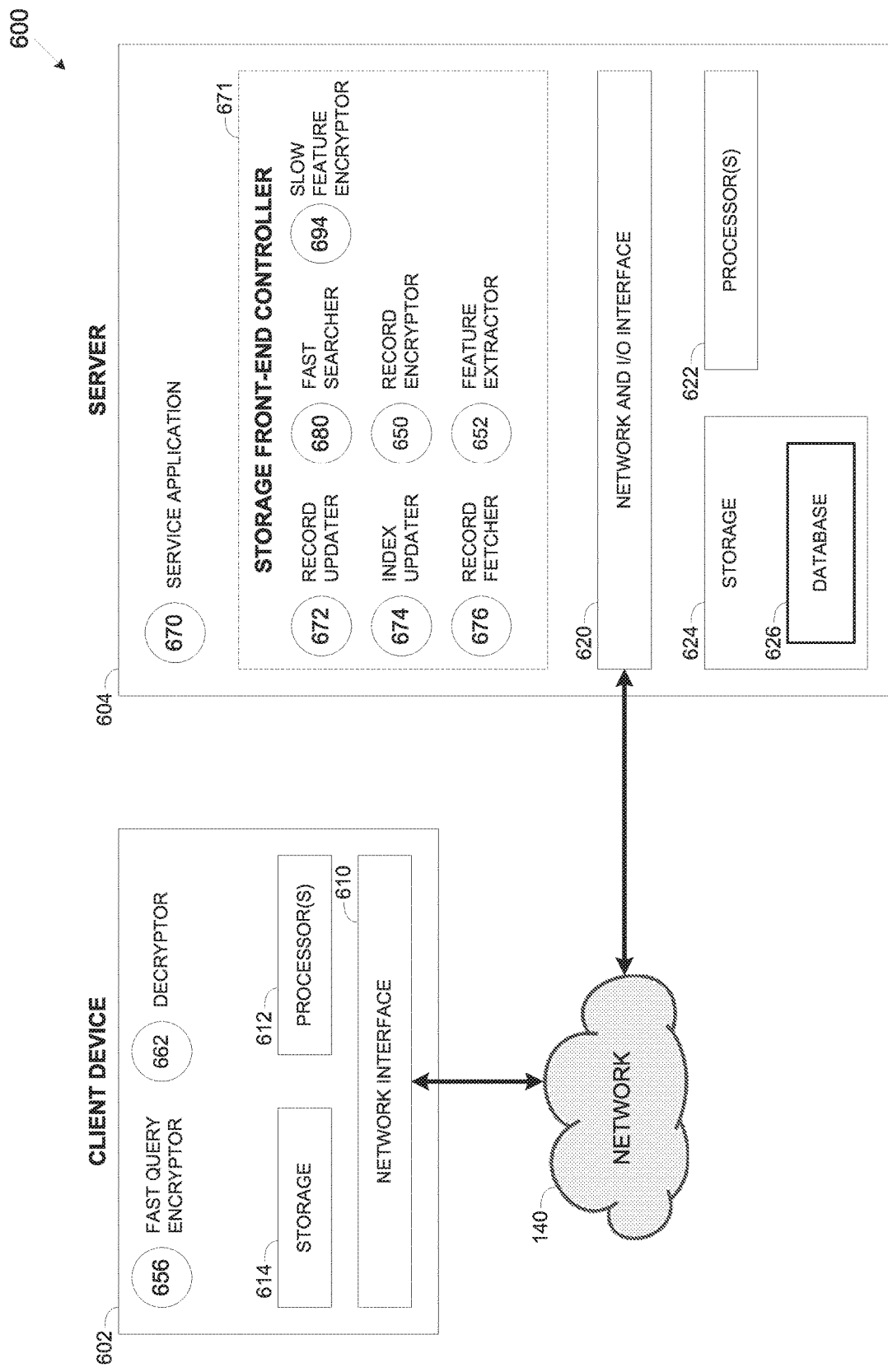
FIG. 6 is a schematic illustration of a second exemplary embodiment of a system for encrypting and searching encrypted data records of a database, according to some embodiments of the present invention.

Reference is now made to FIG. 6, which is a schematic illustration of a second exemplary embodiment of a system for encrypting and searching encrypted data records of a database, according to some embodiments of the present invention. An exemplary system 600 for encrypting and searching encrypted data records of a database may include a server 604 such as the server 104 providing one or more services to one or more client devices 602 such as the client device 102. The client devices 602 may communicate with the server 604 through a network such as the network 140.

The client device 602 may include a network interface 610 such as the network interface 110 for connecting to the network 140, a processor(s) 612 such as the processor(s) 112 and a storage 614 such as the storage 114. The client device 602 may execute and/or host one or more computing modules comprising one or more software, firmware, middleware and/or hardware modules, for example, a fast query encryptor 656 and a decryptor 662.

The server 604 may include a network interface 620 such as the network interface 120 for connecting to the network 140, a processor(s) 622 such as the processor(s) 122 and a storage 624 such as the storage 124. The server 604 may execute one or more software, firmware and/or middleware modules. The server 604 may execute and/or host one or more computing modules, specifically a service application 670 such as the service application 170 for providing one or more services, applications and/or functionalities to one or more of the client devices 602. The service application 170 may further serve data stored in a database 626 such as the database 126. Optionally, the service application 670 and/or the database 626 are provided by one or more of the cloud services.

As described for the system 100, a storage front-end controller 671 such as the storage front-end controller 171 may be applied to facilitate and control the connection between the service application 670 and the database 626. As described for the system 100, while the storage front-end controller 671 may typically be hosted by the server 604, in some embodiments the storage front-end controller 671 may be hosted and/or executed by a separate server communicating with the server 604 over the network 140. The storage front-end controller 671 may include one or computing modules, for example, a record updater 672, an index updater 674, a record fetcher 676, a fast searcher 680, a record encryptor 650, a feature extractor 652 and a slow feature encryptor 694.

The client device 602 may transmit one or more plaintext records to the server 604, specifically to the storage front-end controller 671 which may encrypt the plaintext records) and update them in the database 626. This is in contrast to the system 100 where the encryption of the plain text record(s) is done by the client device 102 such that the records transmitted to the storage front-end controller 171 are already encrypted.

Most of the computing modules and execution flows of the computing modules hosted by both the client device 602 and the storage front-end controller 671 are substantially similar to corresponding components described in the system 100. As such, for the client device 602, the fast query encryptor 656 corresponds to the fast query encryptor 156 and the decryptor 662 corresponds to the decryptor 162. For the storage front-end controller 671, the record encryptor 650 corresponds to the record encryptor 150, the record updater 672 corresponds to the record updater 170, the feature extractor 652 corresponds to the feature extractor 152, the slow feature encryptor 694 corresponds to the slow feature encryptor 194, the index updater 674 corresponds to the index updater 174, the record fetcher 676 corresponds to the record fetcher 176 and the fast searcher 680 corresponds to the fast searcher 180.

However due to the different deployment of the encryption modules some of the computing modules may be removed, modified and/or adapted accordingly. For example, fast feature encryption and slow searching may not be required since the records are available in the plaintext format at the storage front-end controller 671 thus eliminating the need for computing modules corresponding to the fast feature encryptor 154, the slow query encryptor 158 and slow searcher 182. In another example, since the encryption is done by the storage front-end controller 671 and features may be extracted by the features extractor 652 the background feature extractor 190 may be removed. Moreover, some of the computing models may be modified to include functionality of one or more of the computing modules described in the system 100. For example, the fast query encryptor 656 may be adapted to issue one or more queries comprising both the fast query token as well as the plaintext query expression. In another example, the fast searcher 680 may be adapted to apply both plaintext search for searching plaintext feature(s) in the non-indexed records as well the fast search to search the encrypted index for encrypted index entries mapping the indexed encrypted records comprising the queried features. Moreover, the fast searcher 680 may further perform at least partially as the unified searcher 178 employing both the plaintext search on the non-indexed records and the fast search on the indexed encrypted records. In another example, the index updater 674 may undertake the roles and functionality of the index rebuilder 192.

A major advantage of the system 600 deployment in which the record and feature encryption are done by the storage front-end controller 671 is the capability of the service application 670 to validate and manipulate plaintext records before they are forwarded to the record encryptor 650. However such deployment may compromise the privacy, security and/or integrity of the unencrypted data exchanged between the client device(s) 602 and the front-end 671.

The deployment of the system 100 in which the record and feature encryption are done by the client device 102 may ensure such data privacy, security and/or integrity since the data exchanged between the client device(s) 102 and the front-end 171 is encrypted. Such implementation may naturally offer less flexibility to the service application 170.

According to some embodiments of the present invention there are provided systems and methods for executing, in an isolated environment, one or more function on one or more encrypted records of a database such as the database 126 and/or the database 626.

Figure 7:
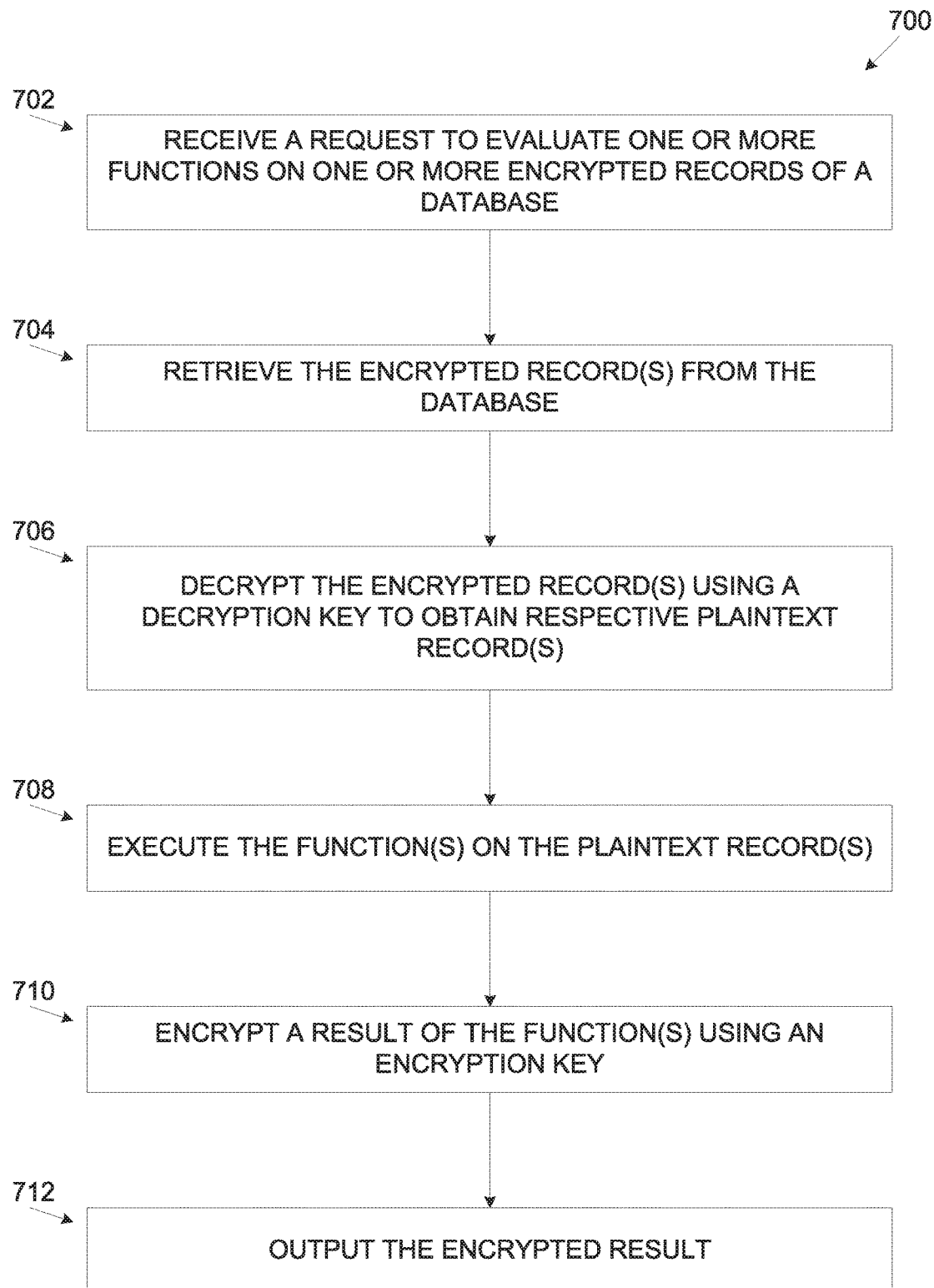
FIG. 7 is a flowchart of an exemplary process of executing a function on encrypted data record(s) of a database in an isolated system, according to some embodiments of the present invention.

Reference is now made to FIG. 7, which is a flowchart of an exemplary process of executing a function on encrypted data record(s) of a database in an isolated system, according to some embodiments of the present invention. An exemplary process 700 may be executed for executing one or more functions on one or more encrypted records of a database such as the database 126 and/or the database 626.

Figure 8:
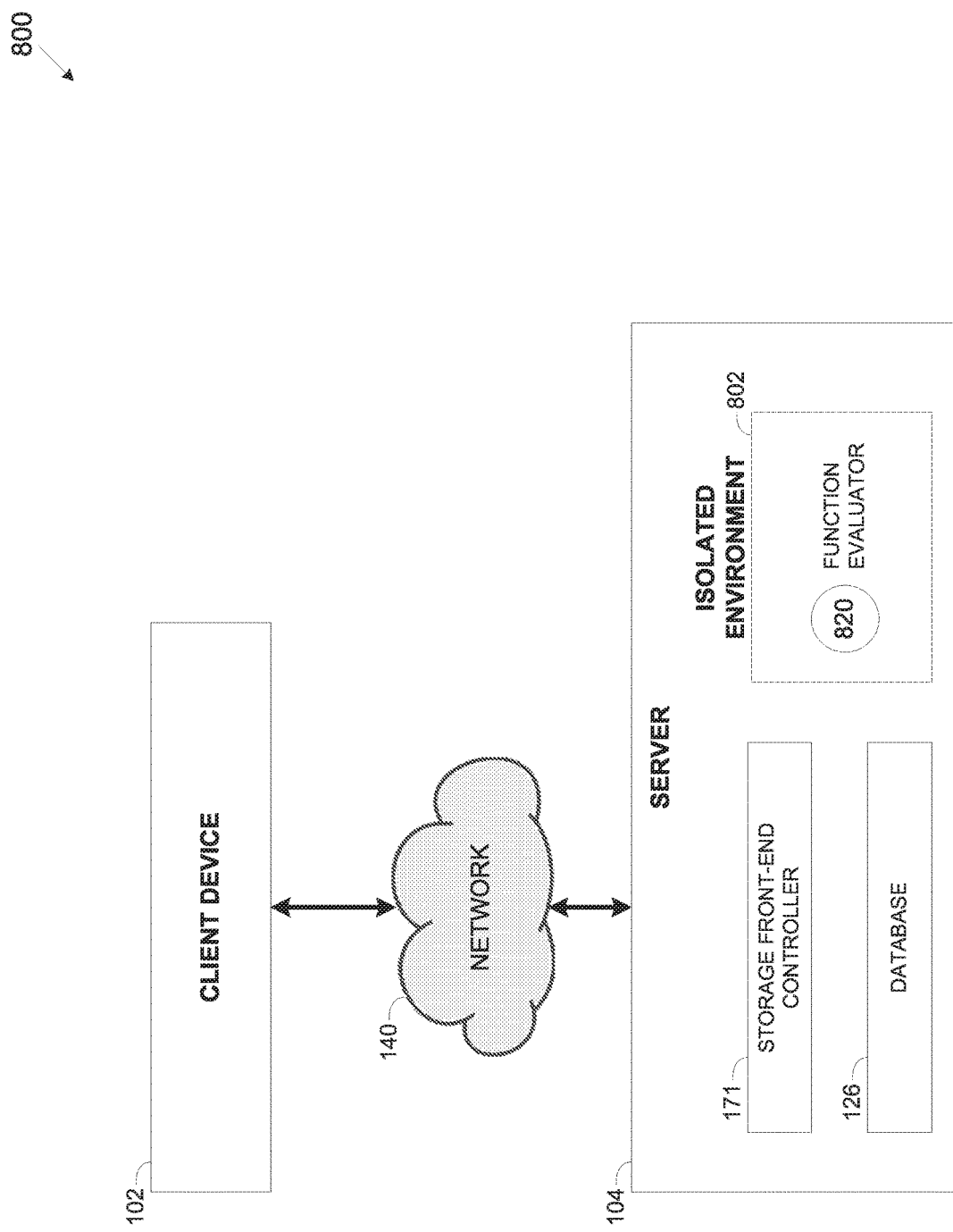
FIG. 8 is a schematic illustration of an exemplary isolated environment for executing a function on encrypted data record(s) of a database, according to some embodiments of the present invention.

Reference is also made to FIG. 8, which is a schematic illustration of an exemplary isolated environment for executing a function on encrypted data record(s) of a database, according to some embodiments of the present invention. An exemplary system 800 for executing a process such as the process 700 may include one or more client devices such as the client device 102, a server such as the server 104 hosting a database such as the database 126 controlled by a storage front-end controller such as the storage front-end controller 171 and an isolated environment 802. The system 800 further includes a network such as the network 140 connecting the client device(s) 102 and the server 104.

The same architecture may apply to the deployment of the system 600 comprising one or more client devices such as the client device 602, a server such as the server 604 hosting a database such as the database 626 controlled by a storage front-end controller such as the storage front-end controller 671. For brevity, the components and/or modules of the system 100 deployment are described herein after, however the same may apply to the system 600 deployment.

The isolated environment 802 may be implemented in the server 104 as an independent and isolated execution environment which may be accessed through predefined and/or predetermined communication channels and/or protocols. For example, the isolated environment 802 may be implemented through a hardware enclave, such as, for example, Intel SGX enclave and/or the like which may provide an isolated execution environment. An independent computing module, function evaluator 820, may be executed within the isolated environment. The function evaluator 820 may be effectively isolated from other computing modules components executed by the server 104. The function evaluator 820 may be accessed only via one or more predetermined interfaces and/or protocols adapted for extremely high separation, integrity, privacy and/or integrity for exchanged data. The function evaluator 820 may include one or more software, middleware, firmware and/or hardware modules, components and/or circuits.

The function evaluator 820 may obtain a key-decryption key, optionally based on the isolated environment hardware of the function evaluator 820 and/or of the isolated device 802. The function evaluator 820 may use the key-decryption key for decrypting one or more encryption and/or decryption keys provided to the function evaluator 820 as part of the function evaluation process.

As shown at 702, the process 700 starts with the function evaluator 820 receiving a function evaluation request defining an evaluation of one or more functions on one or more encrypted records of the database 126. The function evaluator 820 may receive the function evaluation request in one or more of a plurality of forms, for example, an SQL queries, a JVM bytecode and/or the like.

The function evaluator 820 may receive encrypted decryption key(s). The function evaluator 820 may further receive encrypted encryption key(s) associated with the encrypted record(s).

As shown at 704, the function evaluator 820 retrieves the requested encrypted records from the database 126.

As shown at 706, the function evaluator 820 may decrypt the retrieved encrypted record(s). The function evaluator 820 may decrypt the encrypted decryption key(s) using the key-decryption key to obtain the decryption key(s) associated with the encrypted record(s). The function evaluator 820 may decrypt the retrieved encrypted record(s) using the decryption key(s) to obtain respective plaintext record(s).

As shown at 708, the function evaluator 820 may execute the function(s) on the plaintext record(s) to obtain a plaintext result.

As shown at 710, the function evaluator 820 may encrypt the plaintext result. The function evaluator 820 may decrypt the encrypted encryption key(s) using the key-decryption key to obtain the encryption key(s). The function evaluator 820 may encrypt the plaintext result using the encryption key(s).

As shown at 712, the function evaluator 820 may output the encrypted result.

One or more recipients, for example, a decryptor such as the decryptor 162 may receive the encrypted result and a decryption key and may decrypt the encrypted result using the decryption key to obtain the plaintext result.

The function evaluator 820 may provide a means for processing encrypted records of the database 126 in a controlled fashion, since decryption keys and plaintext data can be restricted to the isolated execution environment of the function evaluator 820. The function evaluator 820 may support efficient processing of the encrypted records by multiple diverse functions. The function evaluator 820 may further support execution of any efficiently computable function over a single encrypted record and aggregate functions over a set of encrypted records.

According to some embodiments of the present invention them are provided systems and methods for key management using PRE for serving and distributing encrypted records of a database such as the database 126 and/or the database 626 to a plurality of clients such as, for example, the client device 102 and/or the client device 602. In such embodiment's individual decryption keys may be distributed to a plurality of clients accessing the database.

Figure 9:
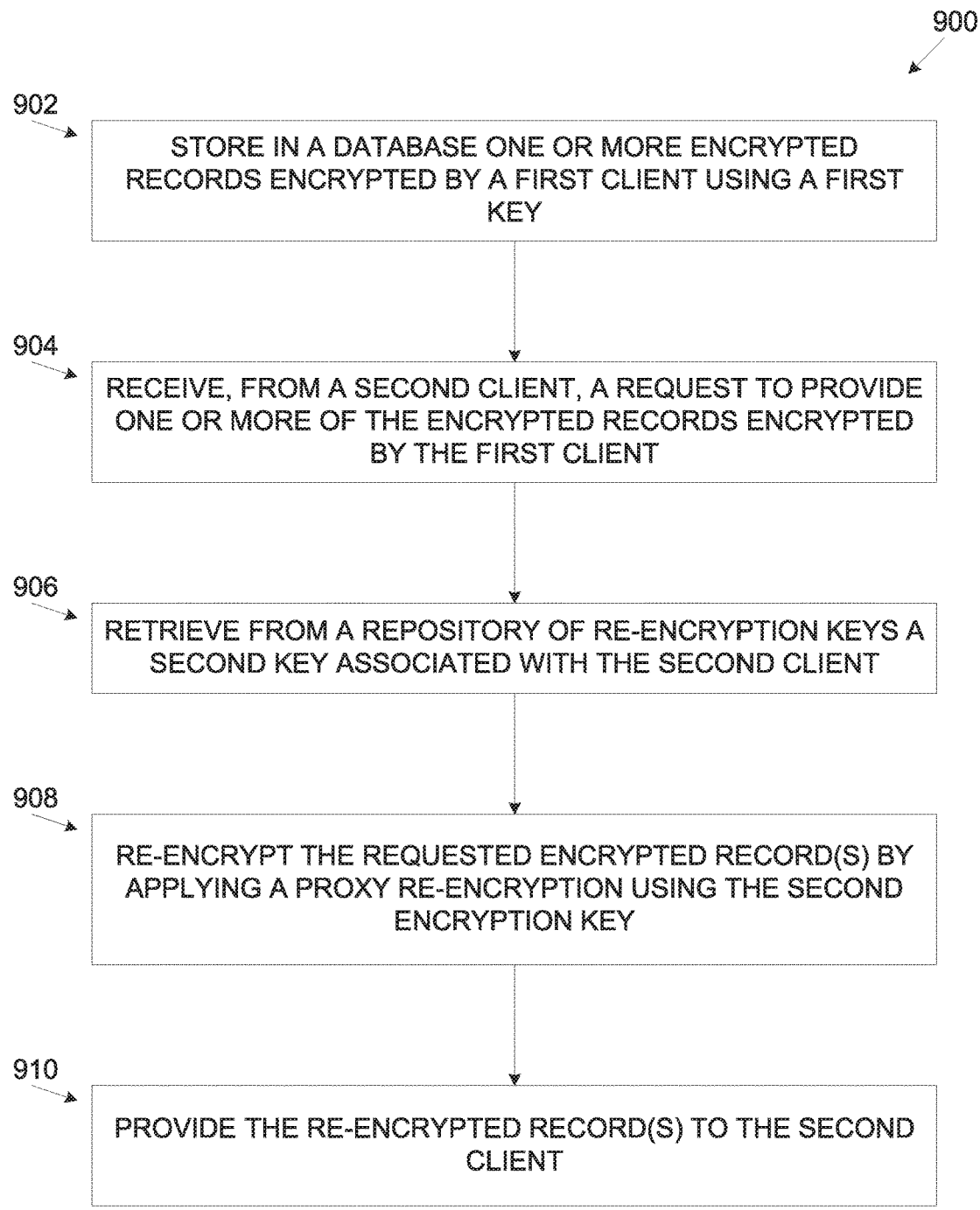
FIG. 9 is a flowchart of an exemplary process of re-encrypting encrypted data record(s) of a database using a Proxy Re-Encryption (PRE) algorithm, according to some embodiments of the present invention.

Reference is now made to FIG. 9, which is a flowchart of an exemplary process of re-encrypting encrypted data records) of a database using a PRE algorithm, according to some embodiments of the present invention. An exemplary process 900 may be executed for managing encryption keys provided to a plurality of clients such as, for example, the client device 102 and/or the client device 602 accessing a database such as the database 126 and/or the database 626 respectively.

Figure 10:
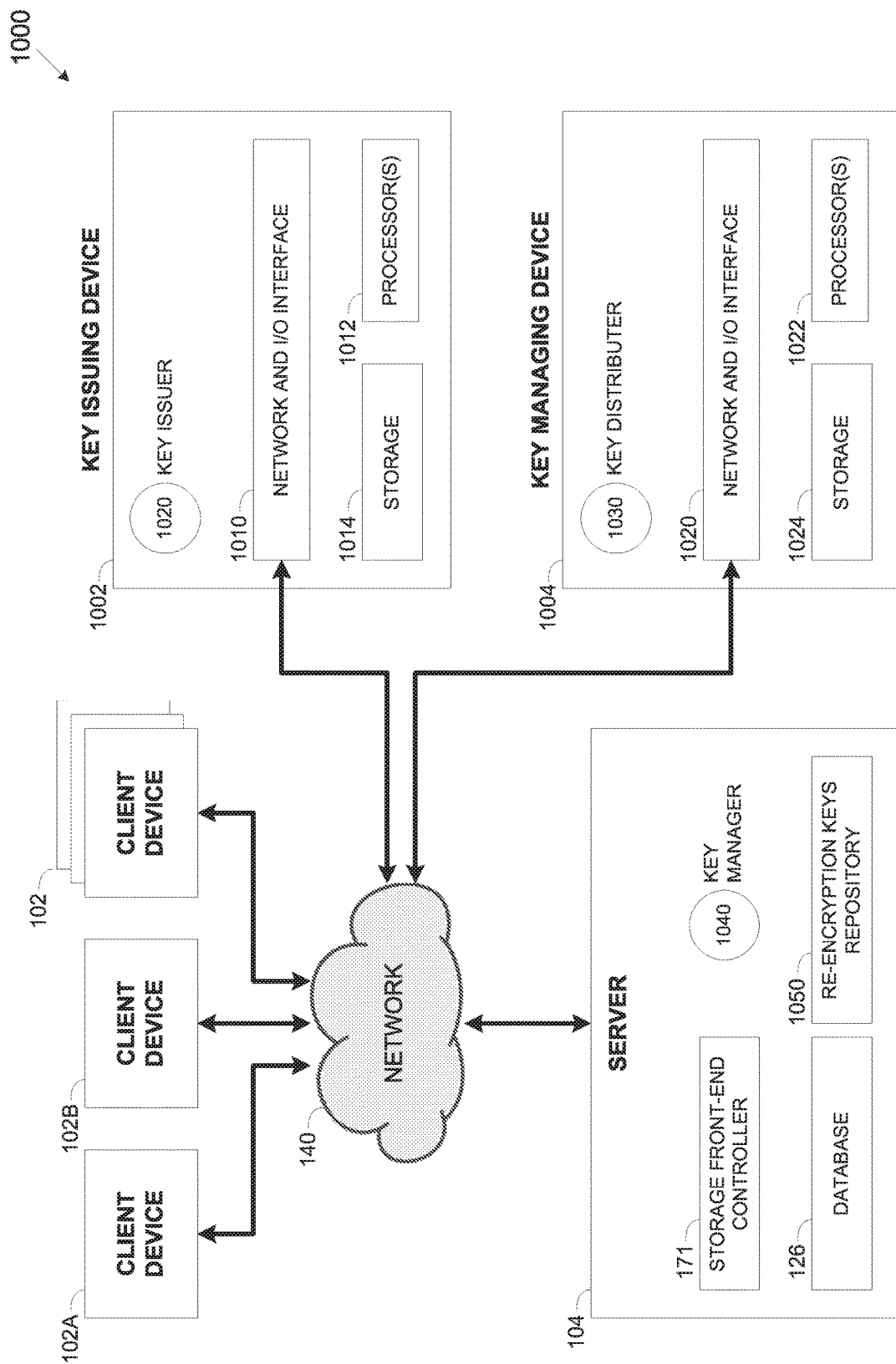
FIG. 10 is a schematic illustration of an exemplary system for re-encrypting encrypted data record(s) of a database using a PRE algorithm, according to some embodiments of the present invention.

Reference is also made to FIG. 10, which is a schematic illustration of an exemplary system for re-encrypting encrypted data record(s) of a database using a PRE algorithm, according to some embodiments of the present invention. An exemplary system 1000 for executing a process such as the process 900 may include one or more client devices such as the client device 102, a server such as the server 104 hosting a database such as the database 126 controlled by a storage front-end controller such as the storage front-end controller 171, a key issuing device 1002 and a key management device 1004. The system 1000 further includes a network such as the network 140 connecting the client device(s) 102, the server 104, the key issuing device 1002 and/or the key management device 1004. A key manager computing module 1040 may be executed at server 104. Moreover, a repository of re-encryption keys 1050 may be stored in a storage such as the storage 124 of the server 104.

The same architecture may apply to the deployment of the system 600 comprising one or more client devices such as the client device 602, a server such as the server 604 hosting a database such as the database 626 controlled by a storage front-end controller such as the storage front-end controller 671. For brevity, the components and/or modules of the system 100 deployment are described herein after, however the same may apply, to the system 600 deployment.

Typically, the key issuing device 1002 and/or the key management device 1004 may be implemented as computing module, key issuer 1020 and key manager 1030 respectively, executed by the server 104 and taking advantage of the software and/or hardware components and/or circuits of the server 104.

Optionally, the key issuing device 1002 may include one or more physically separated devices accessible via the network 140. The separate key issuing device 1002 may include a network interface 1010 such as the network interface 120 for connecting to the network 140, a processor(s) 1012 such as the processor(s) 122 and a storage 1014 such as the storage 124. In such case the key issuer 1020 computing module may be executed by the processor(s) 1012. Similarly the key managing device 1004 may optionally include one or more physically separated devices accessible via the network 140. The separate key managing device 1004 may include a network interface 1020 such as the network interface 120 for connecting, to the network 140, a processor(s) 1022 such as the processor(s) 122 and a storage 1024 such as the storage 124. In such case the key manager 1030 computing module may be executed by the processor(s) 1022. Optionally, the key issuing device 1002 and the key managing device 1004 are combined such that the key issuer 1020 and the key manager 1030 are executed by the same device(s).

In order to increase security and allow only trusted clients to access the database 126, each client such as the client device 102 may be assigned with individual decryption and/or search keys.

As shown at 902, the process 900 starts with a record updates such as the record updater 172 receiving one or more encrypted records from a first client, for example, a client device 102A and updating the received encrypted records) in the database 126. The encrypted record(s) are encrypted with a first encryption key.

As shown at 904, the record fetcher 176 receives from a second client, for example, a client device 102B a request to provide one or more of the encrypted records encrypted using the first encryption key.

As shown at 906, the key manager 1040 may retrieve from the repository of re-encryption keys a re-encryption key associated with the diem device 102B. The re-encryption key is generated using a PRE scheme, for example, Ivan-Dodis PRE scheme and/or the like as described herein after.

As shown at 908, the record fetcher 176 may re-encrypt the requested encrypted record(s) using the re-encryption key associated with the client device 102B and received from the key manager 1040.

As shown at 910, the record fetcher 176 may provide the re-encrypted record(s) to the client device 102B. Using a decryption key created for it, the client device 102B may decrypt the re-encrypted record(s) to obtain respective plaintext record(s).

The process 900 is based on a key generation and distribution mechanism in which a keyset may be generated and distributed to one or more trusted client device 102. Each keyset may include, for example, an encryption key, a decryption key, a search key and/or the like.

The key issuer 1020 may receive a master key (MSK) and may generate, based on the master key and using a PRE scheme, an encryption key, a decryption key and/or a re-encryption key. The key issuer 1020 may employ one or more PRE schemes, for example, Ivan-Dodis PRE scheme and/or the like. The key issuer 1020 may generate a key distribution request comprising one or more user keysets. Each of the user key sets may include the decryption key and a search key, in particular a decryption key created for a certain client such as the client device 102. The key issuer 1020 may encrypt one or more of the user keysets to provide encrypted user keyset(s) and include the encrypted user keyset in the key distribution request. For example, the key issuer 1020 may encrypt a certain keyset using an Mhos key associated with a respective client device 102 for which the certain keyset is created. The key issuer 1020 may further include the re-encryption key in the key distribution request, possibly in encrypted form. The key issuer 1020 may include a user identity, a device identity or a combination thereof in the key distribution request and may further include a key identity in the key distribution request.

The key manager 1040 may receive the re-encryption key and may store the re-encryption key in the repository of re-encryption keys 1050.

Key manager 1040 may receive a revocation request including a reference to one or more specific re-encryption keys, and may remove the referenced re-encryption key(s) from the repository of re-encryption keys 1050.

The key distributer 1030 may receive the key distribution request and may generate a key management record based on the key distribution request. The key distributer 1030 may store the key management record in the storage 1024. Naturally, in case the key distributer 1030 is hosted by the server 104, the key distributer 1030 may store the key management record in the storage 124.

The process 900 and employment of the PRE scheme(s) may provide fine-grained control over access to the database 126 for a group of users, wherein each user may be independently added or removed from the group. The key manager 1040 allows adding and removing users without processing large amounts of encrypted data but rather, only issuing or revoking a single re-encryption key per client device 102. Moreover, revocation of the re-encryption key does not require the cooperation of the client device 102, specifically in case the client device 102 is not trusted.

Optionally, the key issuer 1020 applies key rotation for an existing master key. The key issuer 1020 may receive a first master key and may generate a second master key and a rotation key based on the first master key using one or more of the PRE schemes. The record updater 172 may receive the rotation key from the key issuer 1020 and may retrieve a first record key associated with a certain encrypted record of the database 126. The record updates 172 may then re-encrypt the certain record key using the rotation key according to the selected PRE scheme to provide a second record key. The record updater 172 may then update the re-encrypted record in the database 126 with the second record key.

The key issuer 1020 may receive a key management record from the key distributer 1030 and may generate a key distribution request based on the key management record and on the second master key. For example, the key issuer 1020 may request all key management records associated with the first master key, generate a new user keyset for each user identity included in each of the key management records and include the user keyset(s) (in an encrypted form) in a new key distribution request that is sent to the key distributer 1030.

By employing the key rotation process decryption may be avoided altogether so no sensitive keys are exposed. Moreover, long and time-consuming download-then-upload process may be avoided. Furthermore, the key rotation may require modifying only a single, small field, i.e. the record key, for each encrypted record. The key rotation may be useful, for example, for replacing a stolen master key.

Distribution of the keysets to the client devices 102 may be done using one or more distribution schemes.

The client device 102 may authenticate with key distributer 1030 using one or more user authentication scheme, for example. Secure Remote Password (SRP), Security Assertion Markup Language (SAML), OpenID and/or the like. The client device 102 may establish a secure channel based on the authentication. The client device 102 may use using one or more asymmetric encryption scheme such as, for example, ElGamal or RSA and/or the like to generate an inbox key pair comprising an inbox private key and an inbox public key.

The client device 102 may send the inbox public key to the key distributer 1030, preferably over the secure channel. The key issuer 1020 may generate a user keyset for the client device 102, The key issuer 1020 may receive the inbox public key from the key distributer 1030 and may further encrypt the user keyset generated for the client device 102 using the inbox public key to provide an encrypted user keyset.

The key distributer 1030 may obtain the encrypted user keyset generated for the client device 102 by the key issuer 1020 and may transmit the encrypted user keyset to the client device 102.

Such a distribution implementation for distributing respective encrypted user keysets to a plurality of client device 102 may enable distributing the keysets from the trusted key issuer 1020 to trusted client devices 102 which are not directly connected and enables utilizing existing authentication infrastructure providing single sign-on (SSO) functionality rather than requiring a separate dedicated authentication system.

The client device 102 may receive the encrypted user keyset and may store it locally. Optionally, the client device 102 may decrypt the encrypted user keyset using its respective inbox private key to obtain the user keyset. The client device 102 may generate a local storage key and may encrypt the user keyset using the local storage key. The client device 102 may transmit the local storage key to the key distributer 1030 which may store the local storage key for a backup. At a later time, in case the client device 102 needs to restore its keyset and is not accessible locally, the client device 102 may authenticate to the key distributer 1030 and request the local storage key stored by the key distributer 1030. The client device 102 may then decrypt the encrypted user keyset using the local storage key to restore its user keyset.

This may facilitate a backup mechanism for the sensitive user keys without exposing plaintext keys to the backup holder, i.e. the key distributer 1030. This may further enable restoring the keyset in case the locally stored keyset is lose, the client device 102 is lost or stolen and/or the like.

A certain client device 102 may receive a password and may derive a password key from the password using one or more password hashing algorithms such as, for example, PBKDF2, Argon2 and/or the like. The certain client device 102 may encrypt the user keyset using the password key to provide an encrypted user keyset. The key distributer 1030 may receive the encrypted user keyset and store the encrypted user keyset for a backup. At a later time, another client device 102 associated with the same user of the certain client device 102 may request and receive the password and the encrypted user keyset and may decrypt the encrypted user keyset to obtain the user keyset.

This may allow for a backup mechanism for the sensitive user keys without exposing plaintext keys to the backup holder, i.e. the key distributer 1030. This may further enable transfer of sensitive keys from one client device 102 to another client device 102 when these client devices are not directly connected.

It is expected that during the life of a patent maturing from this application many relevant systems, methods and computer programs will be developed and the scope of the terms encryption/decryption key and PRE algorithms are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in same embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be

What is claimed is:

1. A computer implemented method of searching for a match of at least one feature in a plurality of encrypted records, comprising:
    using at least one processor of a server associated with a database comprising a plurality of encrypted records, the at least one processor is adapted for:
        receiving a query for searching at least one plaintext feature in the plurality of encrypted records, the query comprises a first hash value calculated for each of the at least one plaintext feature;
        calculating, for each of the plurality of encrypted records, a second hash value based on the first hash value and a nonce associated with each encrypted record;
        sorting a set of second hash values according to their value to provide a sorted hash array for the record by a fast feature encryptor;
        searching for a match of the second hash value in each of a plurality of sorted hash arrays each associated with a respective one of the plurality of encrypted records using a binary search algorithm, each sorted hash array comprising the set of second hash values sorted according to their value, each of the second hash values is calculated for a respective feature of the respective encrypted record based on the first hash of the respective feature and the nonce of the respective encrypted record; and
        outputting an indication of matching encrypted records according to the match.

2. A system for searching for a match of at least one feature in a plurality of encrypted records, comprising:
    at least one processor of a server associated with a database comprising a plurality of encrypted records, the at least one processor is adapted to execute a code, the code comprising:
        code instructions to receive, from at least client device, a query for searching at least one plaintext feature in the plurality of encrypted records, the query comprises a first hash value calculated for each of the at least one plaintext feature;
        code instructions to calculate, for each of the plurality of encrypted records, a second hash value based on the first hash value and a nonce associated with each encrypted record;
        code instructions to sort a set of second hash values according to their value to provide a sorted hash array for the record by a fast feature encryptor;
        code instructions to search for a match of the second hash value in each of a plurality of sorted hash arrays each associated with a respective one of the plurality of encrypted records using a binary search algorithm, each sorted hash array comprising the set of second hash values sorted according to their value, each of the second hash values is calculated for a respective feature of the respective encrypted record based on the first hash of the respective feature and the nonce of the respective encrypted record; and
        code instructions to output an indication of matching encrypted records according to the search.

3. A computer implemented method of searching for a match of at least one feature in a plurality of encrypted records, comprising:
    using at least one processor of a server associated with a database comprising a plurality of encrypted records, the at least one processor is adapted for:
        receiving a query for searching at least one plaintext feature in the plurality of encrypted records, the query comprises a first hash value calculated for the at least one plaintext feature;
        searching for the plaintext feature in the plurality of encrypted records in a sequence of search iterations, each search iteration comprising:
            selecting at least one value from a sequence of values and calculating at least one second hash value based on each of the at least one value and on the first hash value, and
            searching for a match of the at least one second hash value in an encrypted index comprising a plurality of encrypted index entries each comprising a respective second hash value and an identifier associated with one of the plurality of the encrypted records; and
        outputting an indication of matching encrypted records according to the match,
        wherein the searching terminates at detection of at least one termination condition, and
        wherein an identifier of the matching encrypted records is extracted from each of the encrypted index entries.

4. The computer implemented method of claim 3, wherein the at least one termination condition comprises a first termination condition dictating termination of the search in case only some of the at least one second hash value selected in a current iteration has been found in the plurality of encrypted index entries.

5. The computer implemented method of claim 3, wherein the at least one termination condition comprises a second termination condition dictating termination of the search in case a second hash value calculated based on a non-consecutive value is not found in the plurality of encrypted index entries in a previous iteration.

6. The computer implemented method of claim 3, wherein selecting at least one value from a sequence of values comprises selecting non-consecutive values.

7. The computer implemented method of claim 3, the method further comprising:
    receiving one or more plaintext features extracted from a plaintext record; and
    calculating a fast hash value for each of the plaintext features by applying a first pseudo random function on each plaintext feature using a first key.

8. The computer implemented method of claim 3, the method further comprising:
    generating a feature encryption key for each of the plaintext features by applying a second pseudo random function on each plaintext feature using a second key; and
    outputting the first hash value and the encryption key for each of the plaintext features.

9. The computer implemented method of claim 3, the method farther comprising:
    initiating periodically a rebuilding process to apply indexing to one or more non-indexed encrypted records of the database by an index rebuilder.

* * * * *

UNITED STATES PATENT AND TRADEMARK OFFICE
CERTIFICATE OF CORRECTION

PATENT NO. : 11,366,921 B2
APPLICATION NO. : 16/487893
DATED : June 21, 2022
INVENTOR(S) : Aviad Lahav et al.

It is certified that error appears in the above-identified patent and that said Letters Patent is hereby corrected as shown below:

On the Title Page

Add --(73) Assignee: RingCentral Inc., Belmont, CA-- immediately after the listing of the inventors.

In the Claims

In Claim 9, Column 38, Line 60, "method farther comprising:" should read --method further comprising:--.

Signed and Sealed this
Fifteenth Day of November, 2022

*Katherine Kelly Vidal*
*Director of the United States Patent and Trademark Office*